US012781429B2

(12) United States Patent
Teramoto et al.

(10) Patent No.: US 12,781,429 B2
(45) Date of Patent: Nov. 3, 2026

(54) NONWOVEN SUBSTRATE, FIBROUS MATERIAL FOR LIQUID CLARIFICATION, PRODUCTION METHOD FOR SAID MATERIAL, AND CLEANER EQUIPPED WITH SAID MATERIAL

(71) Applicant: JAPAN HEMOTECH CO., LTD., Kanagawa (JP)

(72) Inventors: Yuzo Teramoto, Kanagawa (JP); Hiroyuki Akasu, Kanagawa (JP); Hisatoshi Kobayashi, Kanagawa (JP)

(73) Assignee: JAPAN HEMOTECH CO., LTD., Kanagawa (JP)

( * ) Notice: Subject to any disclaimer, the term of this patent is extended or adjusted under 35 U.S.C. 154(b) by 461 days.

(21) Appl. No.: 18/292,264

(22) PCT Filed: Jul. 27, 2022

(86) PCT No.: PCT/JP2022/028976
§ 371 (c)(1),
(2) Date: Jan. 25, 2024

(87) PCT Pub. No.: WO2023/008490
PCT Pub. Date: Feb. 2, 2023

(65) Prior Publication Data

US 2024/0352665 A1 Oct. 24, 2024

(30) Foreign Application Priority Data

Jul. 29, 2021 (JP) ................................ 2021-123959

(51) Int. Cl.
*D06M 15/15* (2006.01)
*B01D 15/22* (2006.01)
(Continued)

(52) U.S. Cl.
CPC ............ *D06M 15/15* (2013.01); *B01D 15/22* (2013.01); *B01J 20/261* (2013.01); *B01J 20/265* (2013.01);
(Continued)

(58) Field of Classification Search
CPC ... A61M 1/3679; A61M 1/3687; B01D 15/22; B01J 20/261; B01J 20/264; B01J 20/265;
(Continued)

(56) References Cited

U.S. PATENT DOCUMENTS 4,661,260 A 4/1987 Kodama et al.
5,510,242 A 4/1996 Blais
(Continued)

FOREIGN PATENT DOCUMENTS

CN 1628150 A 6/2005
CN 1806008 A 7/2006
(Continued)

OTHER PUBLICATIONS

CN second office action with English translation, dated Sep. 21, 2024, 6 pages.
(Continued)

*Primary Examiner* — Brian A Mccaig
(74) *Attorney, Agent, or Firm* — Cowan, Liebowitz & Latman, P.C.; Mark Montague

(57) ABSTRACT

Provided are a fiber material for liquid purification, being inexpensive, capable of reducing cleaning, and suppressing the generation of fine particles, and a cleaning device including the same. The present invention relates to a nonwoven fabric base material containing a mixed resin of polyolefin and a styrene-olefin copolymer in a single fiber, which is used as a fiber material for liquid purification for removing a biotoxic substance from liquid, wherein the mass ratio of the polyolefin to the mass of the mixed resin
(Continued)

is 10% by mass or more and 80% by mass or less and the mass ratio of all styrene residues to the mass of the styrene-olefin copolymer is 5% by mass or more and 50% by mass or less, a fiber material for liquid purification including the nonwoven fabric base material, a method for producing the material, and a cleaning device including the material.

9 Claims, 11 Drawing Sheets

(51) Int. Cl.

| | |
|---|---|
| ***B01J 20/26*** | (2006.01) |
| ***B01J 20/28*** | (2006.01) |
| ***B01J 20/32*** | (2006.01) |
| ***D04H 1/4291*** | (2012.01) |
| ***D04H 1/4382*** | (2012.01) |
| ***D04H 3/16*** | (2006.01) |
| ***D06M 11/07*** | (2006.01) |
| *D06M 101/20* | (2006.01) |

(52) U.S. Cl.

CPC ... *B01J 20/28023* (2013.01); *B01J 20/28033* (2013.01); *B01J 20/321* (2013.01); *B01J 20/3219* (2013.01); *B01J 20/3268* (2013.01); *D04H 1/4291* (2013.01); *D04H 1/43825* (2020.05); *D04H 3/16* (2013.01); *D06M 11/07* (2013.01); *D06M 2101/20* (2013.01); *D10B 2321/121* (2013.01); *D10B 2505/00* (2013.01); *D10B 2509/00* (2013.01)

(58) Field of Classification Search

CPC ............ B01J 20/28023; B01J 20/28033; B01J 20/321; B01J 20/3219; B01J 20/3268; B01J 20/3274; C08L 53/025; D01F 8/06; D01F 8/10; D04H 1/4282; D04H 1/4291; D04H 1/43825; D04H 1/46; D04H 1/541; D04H 1/542; D04H 1/544; D04H 1/56; D04H 1/728; D04H 1/732; D04H 3/005; D04H 3/16; D06M 11/07; D06M 15/15; D06M 2101/20; D06M 2321/121

See application file for complete search history.

(56) References Cited

U.S. PATENT DOCUMENTS

| | | | | |
|---|---|---|---|---|
| 6,774,102 | B1 | 8/2004 | Bell et al. | |
| 2004/0214952 | A1 | 10/2004 | Kannan et al. | |
| 2006/0030665 | A1 | 2/2006 | Joly et al. | |
| 2006/0199457 | A1 * | 9/2006 | Hall .......................... | B32B 7/12 442/400 |
| 2012/0152847 | A1 | 6/2012 | Falkenhagen | |
| 2013/0126795 | A1 | 5/2013 | Takahashi et al. | |
| 2017/0253999 | A1 | 9/2017 | Kasuya et al. | |
| 2020/0246776 | A1 | 8/2020 | Kasuya et al. | |
| 2021/0213421 | A1 | 7/2021 | Kanda et al. | |

FOREIGN PATENT DOCUMENTS

| | | | |
|---|---|---|---|
| CN | 102971370 | A | 3/2013 |
| CN | 106714961 | A | 5/2017 |
| CN | 112203758 | A | 1/2021 |
| JP | 60-5166 | | 1/1985 |
| JP | 50-209525 | A | 10/1985 |
| JP | 01-279908 | A | 11/1989 |
| JP | 04-270965 | | 9/1992 |
| JP | 1993071603 | A | 3/1993 |
| JP | 05-329207 | A | 12/1993 |
| JP | 06-022623 | A | 2/1994 |
| JP | 1996201384 | A | 8/1996 |
| JP | 11-104236 | A | 4/1999 |
| JP | 2003-511354 | A | 3/2003 |
| JP | 2003265606 | A | 9/2003 |
| JP | 3533541 | B | 5/2004 |
| JP | 3817808 | B | 9/2006 |
| JP | 2006272075 | A | 10/2006 |
| JP | 2012515577 | A | 4/2012 |
| JP | 2016137099 | A | 8/2016 |
| JP | 2019136499 | A | 8/2019 |
| WO | 2019049961 | A1 | 3/2019 |

OTHER PUBLICATIONS

First Office Action and EnglishTranslation of CN202280003688.1, issued Apr. 17, 2024.

English Translation of Written opinion of the International Searching Authority of PCT/JP2022/028976, issued Sep. 6, 2022.

English Translation of the International International Search Report and its English Translation of PCT/JP2022/028972, issued Sep. 6, 2022.

English Translation of Written opinion of the International Searching Authority of PCT/JP2022/028972, issued Sep. 6, 2022.

* cited by examiner

Difference spectrum of tryptophan-immobilized fiber (tryptophanized fiber - chlorinated fiber)

Difference spectrum of arginine-immobilized fiber (arginated fiber - chlorinated fiber)

Difference spectrum of phenylalanine-immobilized fiber (phenylalaninated fiber - chlorinated fiber)

Difference spectrum of aminoethanol-immobilized fiber (aminoethanolated fiber - chlorinated fiber)

Difference spectrum of ethylenediamine-immobilized fiber
(ethylenediaminated fiber - chlorinated fiber)

Difference spectrum of heparin-immobilized fiber (heparinized fiber - aminated fiber)

Azide-immobilized fiber (azidized fiber - chlorinated fiber)

Difference spectrum of lactoferrin-immobilized fiber (lactoferrinized fiber - heparinized fiber)

XPS measurement: change in surface nitrogen due to reaction of immobilizing acid-treated gelatin Untreated fiber Chlorinated fiber Acid-treated gelatin immobilized fiber

NONWOVEN SUBSTRATE, FIBROUS MATERIAL FOR LIQUID CLARIFICATION, PRODUCTION METHOD FOR SAID MATERIAL, AND CLEANER EQUIPPED WITH SAID MATERIAL

CROSS REFERENCE

This application claims priority based on Japanese Patent Application No. 2021-123959 filed in Japan on Jul. 29, 2021, and the contents described in the application are incorporated herein. Further, the contents described in the patent, patent applications, and literature cited in this application are incorporated herein by reference.

TECHNICAL FIELD

The present invention relates to a nonwoven fabric base material, a fiber material for liquid purification comprising the nonwoven fabric base material, a method for producing the fiber material for liquid purification, and a cleaning device comprising the fiber material for liquid purification.

BACKGROUND ART

For the process of removing and purifying contaminants of medical tools, chemicals, and the like, and for reducing the biological reactions caused by biological infections and the biotoxic substances produced by them, a so-called column adsorption device, which removes causative substances by recirculating a target liquid into a device equipped with an adsorption carrier, has been developed, and has achieved great results both industrially and clinically. However, in view of the recent outbreak of COVID-19 and other issues such as the spread and contamination of viruses and biotoxic substances into the environment, there is a desire to develop a new highly functional carrier for purification. For example, in the medical field, apheresis therapy is used to prevent and treat various immune diseases and sepsis, and development of an adsorption blood purifier incorporating an adsorption carrier with high blood compatibility and high causative substance selectivity is underway.

As an example of the adsorbent used in apheresis, Patent Literature 1 (Japanese Patent Laid-Open No. 2019-136499) discloses an adsorbent including a water-insoluble carrier containing a ligand and a base material as a material for removing activated leukocyte-platelet complexes contained in blood, in which the ligand has such a structure that a hydrocarbon group optionally substituted with a substituent selected from the group consisting of a halogen atom, a hydroxyl group, a ketone group, an ether group, and an ester group is bonded to the carbon atom of a secondary amide. Herein, the “ligand” is a chemical substance or chemical structure for imparting adsorption performance, and the “base material” is a material capable of interacting with the ligand.

Patent Literature 2 (International Publication No. WO 2019/049961 A1) discloses an immunosuppressive protein adsorption material and an adsorption column, which use a polymer alloy (mixture) of polystyrene and polypropylene to which one or more nitrogen-containing compounds consisting of a polyamine of a predetermined formula and an aliphatic amine of a predetermined formula are bonded. More specifically, this carrier is a knitted fabric consisting of fibers with a sea-island structure in which multiple fibers consisting of polypropylene are surrounded by the polymer alloy of polystyrene and polypropylene, and this structure is said to maintain physical strength. In the example, the number of fine particles in the column was measured after the column was vibrated horizontally and vertically for one hour in accordance with the Packaging-Complete, filled transport packages and unit loads-Method of vibration test (JIS Z 0232), and it has been shown that the number is small enough to be used for medical purposes.

Many studies have been made regarding knitted fabrics of polymer alloy fibers having the above-described sea-island structure, as shown in Patent Literatures 3 to 10. Wide applicability of the fibers as adsorbent carriers has been shown, for example, Patent Literature 3 (Japanese Patent Publication No. 5-71603) and Patent Literature 4 (Japanese Patent Laid-Open No. 1-279908) disclose application as a bilirubin adsorbent, Patent Literature 5 (Japanese Patent Laid-Open No. 11-104236) describes the adsorption properties of activated macrophages by sea-island structure fibers on which polymyxin B is immobilized, Patent Document 6 (Japanese Patent Publication No. 6-22623) describes an endotoxin adsorbent with a small amount of heparin adsorption, Patent Literature 7 (Japanese Patent Laid-Open No. 60-5166) and Patent Literature 8 (Japanese Patent Laid-Open No. 5-329207) describe the endotoxin removal performance of sea-island structure fibers with immobilized polymyxin, Patent Literature 9 (Japanese Patent Laid-Open No. 60-209525) describes the degradability of endotoxin, and Patent Literature 10 (Japanese Patent No. 3817808) has adsorption properties for enterotoxin in addition to endotoxin.

The polymer material constituting the sea-island structure fiber is described in detail in, for example, Patent Literature 1 as follows.

(Quoted below): “The material for removing the activated leukocyte-activated platelet complex includes a water-insoluble carrier containing a ligand and a base material, the ligand . . . ”, “The base material is, for example, a polymeric material containing, in a repeating structure, functional groups that are reactive with carbocations, such as aromatic rings and hydroxyl groups, and may be a synthetic polymer material such as poly(aromatic vinyl compounds) (e.g., polystyrene), polyesters (e.g., polyethylene terephthalate, polybutylene terephthalate), polysulfone, polyethersulfone, and polyvinyl alcohol; a natural polymer material such as cellulose, collagen, chitin, chitosan, and dextran; and a derivative in which an alkyl group, a halogen atom, a halogenated alkyl group, an acetal group, an ether group, and the like are added to the synthetic polymer material or the natural polymer material, and examples of the polystyrene derivative include poly p-chloromethylstyrene, poly α-methylstyrene, poly β-methylstyrene, poly p-tert-butoxystyrene, poly p-acetoxystyrene, and poly p-(1-ethoxy) styrene. There are no particular limitations on the composition of these polymer materials, and a homopolymer, a copolymer with a plurality of monomers of the above-described polymer materials, or a physical blend of a plurality of the above-described polymer materials may be used. Particularly, in the material for removing the activated leukocyte-activated platelet complex, poly(aromatic vinyl compound) (e.g., polystyrene) or a derivative thereof, polyester (e.g., polyethylene terephthalate, polybutylene terephthalate) or a derivative thereof, polysulfone or a derivative thereof, or polyether sulfone or a derivative thereof is preferable, and polystyrene or polysulfone or a derivative thereof, that is, polystyrene or a derivative thereof or polysulfone or a derivative thereof is more preferable. Among them, polystyrene or a derivative thereof is still more preferable because of a large number of aromatic rings per unit weight and easily introducing a ligand. In addition, the material used for the base material may include a crosslinked structure. There is no limitation to the crosslinked structure, for example, a material with a crosslinked structure introduced by copolymerizing bifunctional monomers such as divinylbenzene, or a material with a crosslinked structure introduced by reacting a crosslinking agent such as an aldehyde with a functional group such as an aromatic ring or a hydroxyl group in the material is preferable, for ease of procurement, a material with a crosslinked structure introduced by reacting a bifunctional compound with a functional group such as an aromatic ring or a hydroxyl group in the material is more preferable, and formaldehyde is still more preferably used as a crosslinking agent." (end quote).

Patent Literature 11 (Japanese Translation of PCT International Application Publication No. 2003-511354) discloses an endotoxin adsorbent in which oligopeptides exhibiting polydispersity are immobilized on porous beads such as Toyo Pearl HW70EC, Patent Literature 12 (Japanese Translation of PCT International Application Publication No. 2012-515577) discloses an endotoxin adsorbent in which porous particles consisting of polystyrene-divinylbenzene copolymer with a particle size of about 5 μm are hydrophobically coated with polymyxin, Patent Literature 13 (Japanese Patent Laid-Open No. 4-270965) describes an LPS (endotoxin) adsorption carrier in which oligopeptides such as polymyxin B are hydrophobically bonded to the surface of a film or a sheet of polystyrene, a cloth of polyester or polypropylene (woven fabric or nonwoven fabric), or the like, and Patent Literature 14 (Japanese Patent Laid-Open No. 2016-137099) discloses a blood purifier in a soft container with an assembly of porous solid threads mainly composed of cellulose, polymethyl methacrylate, or the like aligned in one direction.

Patent Literature 15 (Japanese Patent No. 3533541) describes in the specification that the nonwoven fabric consisting of a synthetic polymer compound such as polystyrene, polyalkylstyrene, polyethylene, polypropylene, polyethylene terephthalate, polymethyl methacrylate, and polysulfone, a copolymer and block polymer of monomers of those compounds, and a blend and alloy of these polymer compounds may be used as a cell selection filter. Patent Literature 15 also describes that the effective fiber diameter of the filter is 1 μm or more and 100 μm or less from the viewpoint of mechanical strength and surface area.

CITATION LIST

Patent Literature

Patent Literature 1
Japanese Patent Laid-Open No. 2019-136499
Patent Literature 2
International Publication No. WO 2019/049961 A1
Patent Literature 3
Japanese Patent Publication No. 5-71603
Patent Literature 4
Japanese Patent Laid-Open No. 1-279908
Patent Literature 5
Japanese Patent Laid-Open No. 11-104236
Patent Literature 6
Japanese Patent Publication No. 6-22623
Patent Literature 7
Japanese Patent Laid-Open No. 60-5166
Patent Literature 8
Japanese Patent Laid-Open No. 5-329207
Patent Literature 9
Japanese Patent Laid-Open No. 60-209525
Patent Literature 10
Japanese Patent No. 3817808
Patent Literature 11
Japanese Translation of PCT International Application Publication No. 2003-511354
Patent Literature 12
Japanese Translation of PCT International Application Publication No. 2012-515577
Patent Literature 13
Japanese Patent Laid-Open No. 4-270965
Patent Literature 14
Japanese Patent Laid-Open No. 2016-137099
Patent Literature 15
Japanese Patent No. 3533541

SUMMARY OF INVENTION

Technical Problem

However, the above-described known adsorbent has problems to be solved.

In Patent Literature 1, the detachability of the ligand upon immersion in water at 50° C. for 24 hours is investigated by pH change, but the pH upon sterilization in an autoclave (121° C., 20 minutes), which is important for practical use, is not mentioned.

In Patent Literature 2, durability against vibration during transportation is evaluated, but the strength and fragility of the carrier itself, which might be of a problem in actual production processes and reaction processes, are not mentioned.

Patent Literatures 3 to 10 disclose various adsorbers using sea-island structure fibers. Regarding the polymer material that is the material of the fiber, there are disclosed, (1) "There are no particular limitations on the composition of these polymer materials, and a homopolymer, a copolymer with a plurality of monomers of the above-described polymer materials, or a physical blend of a plurality of the above-described polymer materials may be used;

(2) Among them, polystyrene or a derivative thereof is more preferable because of a large number of aromatic rings per unit weight and easily introducing a ligand; and (3) A crosslinked structure may be contained.

However, there is no concept of selection that focuses on the fragility of the fiber itself, for example, the generation of fine particles that can become a problem depending on the production process, transportation process, or usage conditions, and in other words, it can be said that the strength is increased by crosslinking. In addition, the reason why polystyrene or a derivative thereof is selected as the optimal material is the number of aromatic rings per unit weight, and the basis of the idea is a large amount of ligand introduced. That is, it is important to have a material with a structure that allows as much ligand as possible to be incorporated therein, and for example, there is no clear example of limiting the amount of aromatic rings in the material itself because of improving the fragility of the fiber material quality. In addition, the sea-island structure fiber requires special production equipment to achieve an elaborate structure thereof, which arises a practical problem of expensive production cost.

Patent Literatures 11 to 14 disclose beads, films, nonwoven fabrics, solid threads, and the like as the shape of the base material or carrier, and list various polymer materials as the base material, but do not specifically investigate the strength, fragility, sterilization resistance, and the like of the base material itself. Example 15 also describes that various polymer materials, copolymers, and block copolymers may be used as base materials, but only "nonwoven fabric consisting of polystyrene" is used in the example, and there is no concept of material selection that takes into account test results regarding fiber fragility (generation of fine particles) or steam sterilization resistance.

As described above, research and development of conventional adsorbents has focused on adsorption performance, especially selectivity. There has been room for improvement in the passability of the base material itself during the production process, which is important when producing water treatment equipment, medical adsorbers, and the like, for example, durability, robustness (little generation of fine particles), and the sterilization resistance of the product, which causes a problem during use. There was also a need for further reduction in production cost.

To explain the problem to be solved more specifically, if the sterilization resistance is poor, there is a hassle of cleaning for a long time before use. Many of the above-described known adsorbents contain a large amount of styrene units, which are reaction sites on the base fiber. Therefore, the amount of the chloromethyl compound, which is a reaction intermediate, introduced also increases. As a result, there are also more residual chloro groups that do not react with activity-inducing compounds such as polymyxins. A large number of chloro groups eliminates hydrochloric acid to a storage solution over time due to surface hydrolysis that occurs during long-term storage. In fact, it is known that when commercially available fiber materials for blood purification are subjected to autoclave sterilization in physiological saline, chlorine groups are eliminated to exhibit acidic with a pH of about 2. When used clinically, the material must be washed with a large amount of physiological saline beforehand, which is inconvenient for the user.

In addition, when the amount of chloromethyl compound introduced is increased, an expensive activity-inducing compound to be immobilized is consumed more than necessary. To reduce cost, it is also conceivable to perform the immobilization reaction with a lower concentration of the activity-inducing compound. However, in the activity-inducing compound that has many free amino groups and the like that serve as active sites in the molecules, amino groups that interact with endotoxin and the like are consumed in the immobilization reaction to decrease the number of free amino groups and the like, causing a concern of reduction in interaction with endotoxin and the like. Therefore, it is necessary to use a high concentration of the activity-inducing compound during the immobilization reaction, increasing the cost of the final product, the fiber material for liquid purification.

In addition, if the base material is fragile, a large number of fine particles will be generated during the reaction treatment in the production process and during the filling operation into the final form, and the removal thereof will require a large amount of water and effort. Particularly, polystyrene is more fragile than polyolefin, and thus there is a high risk that the outermost layer of polystyrene will peel off when force is applied, easily generating fine particles. For use in living bodies, the entry of fine particles into the living body is strictly restricted as stipulated by the Pharmacopoeia, and further, as evidenced by the recent problem with marine microplastics, it is necessary to minimize the risk of fine particles being discharged into the environment.

An object of the present invention is to solve the above-described problems, that is, to provide a fiber material for liquid purification, being inexpensive, capable of reducing cleaning and suppressing the generation of fine particles, and a cleaning device comprising the same.

Solution to Problem

As a result of intensive study on improvements in these points, the inventors surprisingly have found that using a styrene-based block copolymer can provide an inexpensive adsorption base material that exhibits high adsorption performance despite having a lower content of styrene residue per unit weight as compared with conventional base materials using polystyrene, generates significantly fewer fine particles (robustness), and has steam sterilization resistant, and have completed the present invention. Specifically, it is as follows.

(1) A nonwoven fabric base material according to an embodiment for achieving the above object is
 a nonwoven fabric base material comprising a mixed resin of polyolefin and a styrene-olefin copolymer in a single fiber, which is used as a fiber material for liquid purification for removing a biotoxic substance from liquid,
 wherein a mass ratio of the polyolefin to a mass of the mixed resin is 10% by mass or more and 80% by mass or less, and
 a mass ratio of all styrene residues to a mass of the styrene-olefin copolymer is 5% by mass or more and 50% by mass or less.

(2) In the nonwoven fabric base material according to another embodiment, the mass ratio of the polyolefin to the mass of the mixed resin may be preferably 20% by mass or more and 50% by mass or less.

(3) In the nonwoven fabric base material according to another embodiment, the styrene-olefin copolymer may be preferably at least one copolymer selected from the group consisting of a saturated copolymer obtained by polymerization of an aromatic vinyl compound and an olefin having one double bond, an unsaturated copolymer of an aromatic vinyl compound and a diene having two conjugated double bonds, and a hydrogenated saturated copolymer obtained by hydrogenating the unsaturated copolymer.

(4) A fiber material for liquid purification according to one embodiment for achieving the above object is a fiber material for liquid purification comprising any of the above nonwoven fabric base material, wherein
 a substituent containing a halogen group is introduced into the styrene-olefin copolymer as a spacer,
 some of the halogen groups of the spacer is replaced by a ligand that interacts with a biotoxic substance, and
 a halogen content in the fiber material for liquid purification is more than 0 μmol/g and 900 μmol/g or less relative to a mass of the fiber material for liquid purification.

(5) In the fiber material for liquid purification according to another embodiment, the halogen content in the fiber material for liquid purification may be preferably more than 0 μmol/g and 290 μmol/g or less relative to the mass of the fiber material for liquid purification.

(6) In the fiber material for liquid purification according to another embodiment, the ligand is preferably derived from an amino acid, oligopeptide, peptide, saccharide, oligopolysaccharide, antibody, lipopolysaccharide, lipid, proteoglycan, protein, aptamer and/or polyelectrolyte that interact with a biotoxic substance, the ligand has one or more nucleophilic substituents, and the ligand may be supported on the styrene-olefin copolymer by chemical bonding between the nucleophilic substituent and the spacer.

(7) A method for producing the fiber material for liquid purification according to an embodiment for achieving the above object is a method for producing any of the above fiber materials for liquid purification, comprising:

a halogenation step of contacting a halogen compound with the nonwoven fabric base material to provide a halogenated nonwoven fabric; and a ligand supporting step of dehalogenating the halogenated nonwoven fabric to allow the ligand to be supported on the styrene-olefin copolymer.

(8) In the method for producing the fiber material for liquid purification according to another embodiment, the ligand may be preferably a polymyxin.

(9) A cleaning device according to an embodiment for achieving the above object comprises any of the above fiber material for liquid purification therein.

Advantageous Effects of Invention

The present invention can provide a fiber material for liquid purification, being inexpensive, capable of reducing cleaning, and suppressing the generation of fine particles, and a cleaning device including the same.

REFERENCE SIGNS LIST

Figure 1:
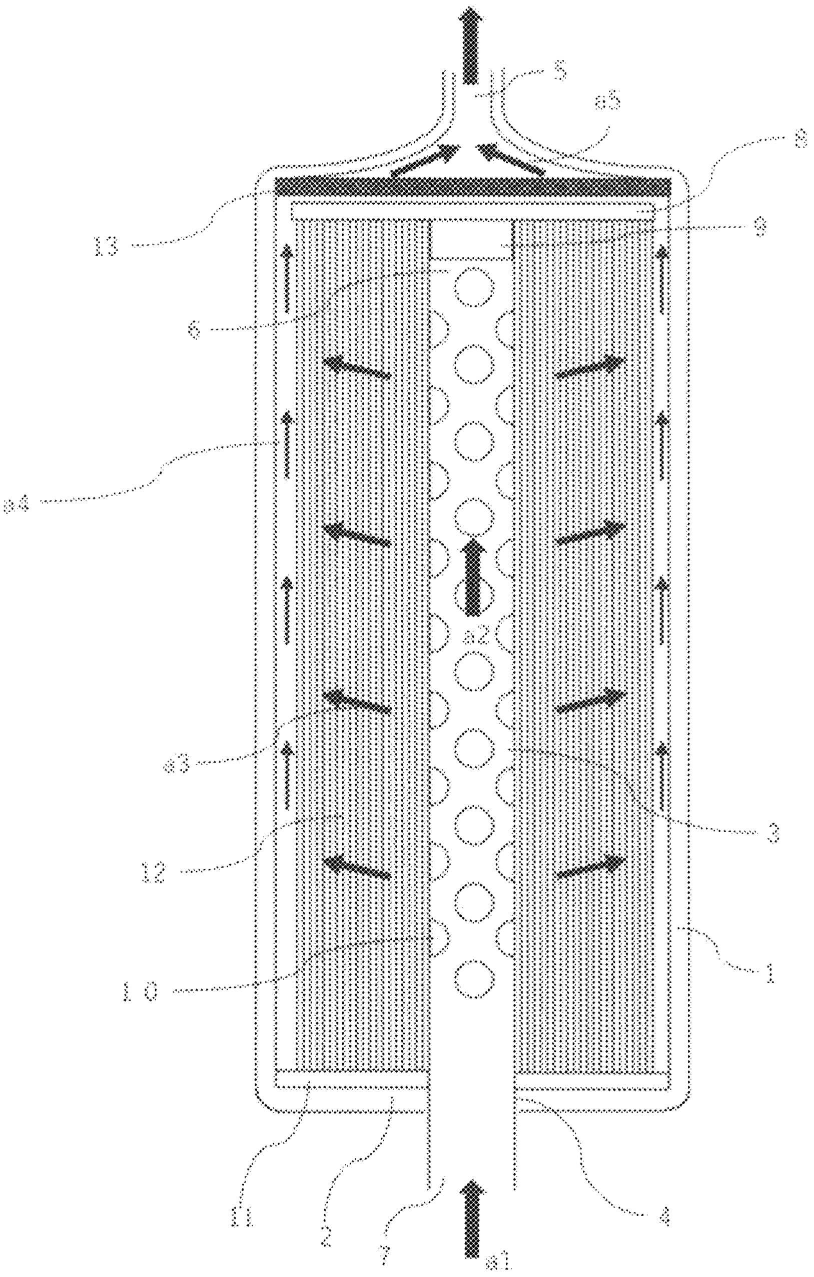
FIG. 1 shows a longitudinal sectional view of a cleaning device according to an embodiment of the present invention.

1: Container body
2: Bottom
3: Pipe
4: Contact surface
5: Outlet
6: Opening
7: Inlet
8: Partition plate
9: Stopper
10: Through hole
11: Internal bottom surface
12: Ligand-immobilized nonwoven fabric
13: Filter
100: Cleaning device

DESCRIPTION OF EMBODIMENTS

Embodiments of the present invention will be described. The embodiments described below do not limit the claimed invention, and not all elements and combinations thereof described in the embodiments are not necessarily essential to the solution of the present invention.

<Nonwoven Fabric Base Material>

The nonwoven fabric base material according to the embodiment of the present invention is used as a fiber material for liquid purification for adsorbing and recovering biotoxic substances from solutions such as blood, plasma, serum, drugs, cell culture fluid, and water. This nonwoven fabric base material consists of a melt-mixed resin of a polyolefin and a styrene-olefin copolymer, and is in the form of a nonwoven fabric of a blend fiber containing the polyolefin and the styrene-olefin copolymer in a single fiber. The nonwoven fabric base material has, for example, the form of a sheet. There are no particular limitations on the planar area of the nonwoven fabric base material. The thickness of the nonwoven fabric base material is, for example, 20 μm or more and 3000 μm or less.

The blend fiber of the polyolefin and styrene-olefin copolymer preferably has an average diameter of 50 nm or more and 500 μm or less, more preferably an average diameter of 80 nm or more and 40 μm or less, and still more preferably an average diameter of 100 nm or more and 30 μm or less. In addition, the blend fiber preferably has an average length of 5 mm or more, more preferably an average length of 10 mm or more, and still more preferably an average length of 20 mm or more. In the present application, the "average diameter" refers to a value obtained by randomly observing a cross section of the fiber observed in 100 fields of view using a scanning electron microscope, a transmission electron microscope, or a digital microscope, determining the diameter when each cross section is converted into a circle, and averaging the obtained diameters for the 100 fields of view. The "average length" refers to a value obtained by randomly observing 100 fields of view of the side surface of the fiber using an optical microscope, determining the length of each fiber when each fiber is made into a straight line, and averaging the obtained lengths for the 100 fields of view. The same applies to the "average diameter" and "average length" that appear below.

The styrene-olefin copolymer is a polymer of two or more styrene monomers and two or more olefin monomers, may be any of copolymers such as a block copolymer, a random copolymer, an alternating copolymer, or a graft copolymer, and is preferably a block copolymer. The styrene-olefin copolymer is preferably at least one copolymer selected from the group consisting of a saturated copolymer obtained by polymerization of an aromatic vinyl compound and an olefin having one double bond, an unsaturated copolymer of an aromatic vinyl compound and a diene having two conjugated double bonds, and a hydrogenated saturated copolymer obtained by hydrogenating the unsaturated copolymer.

The polystyrene block constituting the styrene-olefin block copolymer becomes physical crosslinking points at the glass transition temperature or less and exhibits excellent rubber elasticity. The polyolefin block constituting the styrene-olefin block copolymer has fluidity at the glass transition temperature or more and contributes to easy processability. Preferred examples of the styrene-olefin block copolymer include a diblock type having the form of PS-PO and a triblock type having the form of PS-PO-PS. Herein, "PS" means polystyrene. "PO" means polyolefin. Examples of the styrene-olefin copolymer include: preferably, hydrogenated styrene-olefin copolymers; among them, more preferably, at least one copolymer selected from the group consisting of a styrene-ethylene/butylene-styrene block copolymer (hereinafter may be abbreviated as "SEBS"), a styrene-ethylene/propylene-styrene block copolymer (hereinafter may be abbreviated as "SEPS"), and a styrene-(ethylene-ethylene/propylene)-styrene block copolymer (hereinafter may be abbreviated as "SEEPS"); and still more preferably, SEBS.

The mass ratio of polyolefin in the blend fiber is 10% by mass or more and 80% by mass or less, preferably 20% by mass or more and 50% by mass or less, more preferably 25% by mass or more and 50% by mass or less, and still more preferably 308 by mass or more and 50% by mass or less. Melt-spinning of single styrene-olefin copolymer causes many thread breakages, but melt-mixing of polyolefin improves the spinnability.

The mass ratio of all styrene residues to the mass of the styrene-olefin copolymer is 5% by mass or more and 50% by mass or less, preferably 10% by mass or more and 40% by mass, more preferably 108 by mass or more and 30% by mass or less, and still more preferably 10% by mass or more and 25% by mass or less. If the mass ratio of all styrene residues to the mass of the styrene-olefin copolymer is 5% by mass or more and 50% by mass or less, the number of benzene rings to which halogen groups are introduced is limited, and thus the amount of halogen groups can be suppressed, and the fragility of the nonwoven fabric can be suppressed, thereby further reducing the amount of fine particles generated. Although the amount of halogen groups is reduced, enough ligands can be introduced to adsorb biotoxic substances (in one example, endotoxin), and thus it is possible to reduce the number of ligands required for producing the fiber material for liquid purification, thereby allowing to reduce the cost of the fiber material for liquid purification. Herein, when the ligand-immobilized nonwoven fabric (nonwoven fabric for liquid purification) is made using a nonwoven fabric base material originally created by mixing a polymer containing halogen, "halogen" is interpreted to mean excluding the halogen in the polymer. In addition to endotoxin, the biotoxic substance includes causative substances of various diseases such as enterotoxin, bilirubin, abnormal cells such as blood cancer cells and white blood cells, immunogenic substances, excess biologically essential elements, proteins, lipids, bile acids, viruses, bacteria and their spores, endocrine disruptors, heavy metals (including iron), and amyloid β, the causative agent of Alzheimer's disease.

<Method for Producing Nonwoven Fabric Base Material>

The nonwoven fabric base material can be produced by any method as long as it is possible to form a nonwoven base material using a mixed fiber of polyolefin and the styrene-olefin copolymer. More preferred production methods are a melt blown method, a needle punch method, and an electrospinning method. Each of the above production methods will be explained below.

(1) Melt Blown Method

Polyolefin and a styrene-olefin copolymer are melt-mixed and flowed toward a drum by the force of air through an outlet lined with fine holes. This makes a nonwoven fabric consisting of fibers in which polyolefin and the styrene-olefin copolymer are mixed in a single fiber. Since no binder is used, a nonwoven fabric consisting only of the mixed resin fiber can be obtained.

(2) Needle Punch Method

The fibers consisting of a mixture of polyolefin and a styrene-olefin copolymer are stacked and made into thin multilayers, which are compressed using a machine equipped with needles to produce a nonwoven fabric. This method is a method of using needles to pull up the fibers and entangle the fibers.

(3) Electrospinning Method

This method is also referred to as an electrospinning method. The spinning apparatus includes a DC high-voltage power source, a spinneret, and a collector. Polyolefin and the styrene-olefin copolymer are melt-mixed, and the polymer solution is extruded through the spinneret to which a high voltage is applied. Each extruded polymer solution turns into fibers with nano-level fiber diameters, reaches a grounded collector, and becomes a nonwoven fabric.

The nonwoven fabric base material according to this embodiment can be produced using a production method other than the above, for example, an air-laid method, a spunbond method, or a wet method similar to papermaking.

<Fiber Material for Liquid Purification>

The fiber material for liquid purification according to this embodiment is obtained by introducing a ligand that interacts with a biotoxic substance into the above-described nonwoven fabric base material. Specifically, the fiber material for liquid purification is obtained by introducing a halogen-containing compound as a linker into the styrene residue of the styrene-olefin copolymer constituting the above-described nonwoven fabric, and further eliminating the halogen on the linker to allow the ligand to be supported. That is, the fiber material for liquid purification is obtained by introducing the halogen group-containing substituent into the styrene-olefin copolymer as a spacer, and replacing some of the halogen groups in the spacer with a ligand that interacts with a biotoxic substance.

The ligand has, relative to 1 g of dry mass of the fiber material for liquid purification, preferably more than 0 μmol and 600 μmol or less, more preferably 0.02 μmol or more and 290 μmol or less, still more preferably 0.02 μmol or more and 15 μmol or less, particularly more preferably 0.04 μmol or more and 12.5 μmol or less. The fiber material for liquid purification may contain a halogen because the linker containing a halogen is added to styrene during the production process. The halogen content in the fiber material for liquid purification is, relative to the mass of the fiber material for liquid purification, preferably more than 0 μmol/g and 900 μmol/g or less, more preferably more than 0 μmol/g and 600 μmol/g or less, still more preferably more than 0 μmol/g and 290 μmol/g or less, still more preferably more than 0 μmol/g and 200 μmol/g or less, still more preferably more than 0 μmol/g and 150 μmol/g or less, still more preferably more than 0 μmol/g and 100 μmol/g or less, and particularly more preferably more than 0 μmol/g and 50 μmol/g or less. Herein, when the ligand-immobilized nonwoven fabric (nonwoven fabric for liquid purification) is produced using a nonwoven fabric base material originally created by mixing a polymer containing halogen, "halogen" excludes the halogen in the polymer. This lower halogen content compared to conventional products reduces the number of times the user has to clean the product, making it easier to use.

The ligand that interacts with a biotoxic substance is, for example, derived from an amino acid, an oligopeptide, a peptide, a saccharide, an oligopolysaccharide, a polysaccharide, an antibody, a lipopolysaccharide, a lipid, a proteoglycan, a protein, an aptamer, and/or a polyelectrolyte, but is not limited thereto as long as it has one or more nucleophilic substituents that react with the halogen of the linker. Examples of the nucleophilic substituent include an amino group, an alkoxy group, a thiolate group, and an acetylide group. Exemplary ligands include tryptophan, L($^+$)-arginine, phenylalanine, monoethanolamine, ethylenediamine, heparin, an azide group, lactoferrin, and gelatin. The ligand preferably has an amino group capable of adsorbing endotoxin. The ligand is, for example, an antibiotic or a cationic polymer such as polylysine or polyethyleneimine. As the antibiotic, peptide compounds such as polymyxins and histatin are preferable, and among them, low molecular weight peptides are more preferable, and polymyxins are particularly preferable. Polymyxins include polymyxin A, polymyxin B1, polymyxin B2, polymyxin D1, polymyxin E1, and polymyxin E2. In addition, a salt represented by these sulfates and hydrochlorides can be used. As for the ligand, one of the above-described examples may be used singly, or two or more types may be used in combination. The ligand is supported on the styrene-olefin copolymer by chemical bonding between the nucleophilic substituent and the spacer.

<Method for Producing Fiber Material for Liquid Purification>

The fiber material for liquid purification according to this embodiment can be produced through the following halogenation step and ligand supporting step.

A method for producing the fiber material for liquid purification according to this embodiment is a method for producing any of the above-described fiber materials for liquid purification, comprising a halogenation step of contacting a halogen-containing compound with a nonwoven fabric base material to provide a halogenated nonwoven fabric, and a ligand supporting step of dehalogenating the halogenated nonwoven fabric to allow the ligand to be supported on the styrene-olefin copolymer. Each step will be explained in more detail below.

(1) Halogenation Step

In a container, a nonwoven fabric base material, 2-chloro-N-(hydroxymethyl) acetamide, which is an example of a halogen compound, paraformaldehyde, nitrobenzene, and concentrated sulfuric acid are charged and stirred to react the halogen-containing compound with the styrene residue in the styrene-olefin copolymer constituting the nonwoven fabric base material. Then, the nonwoven fabric is removed from the container and cleaned using distilled water and methanol. Thereafter, the nonwoven fabric is dried to obtain a chlorinated nonwoven fabric (an example of a halogenated nonwoven fabric, the same applies hereinafter) in which the halogen-containing compound is immobilized on styrene.

(2) Ligand Supporting Step

The above-described chlorinated nonwoven fabric and a pH adjusting agent are charged into a solution obtained by mixing the ligand or a salt thereof and distilled water in a container, and the mixture is stirred. Then, the nonwoven fabric is taken out of the container and cleaned with distilled water to remove unreacted ligands and free hydrochloric acid. Subsequent drying provides a ligand-supported nonwoven fabric. Through this step, the chloro group of the chlorinated nonwoven fabric is eliminated and becomes hydrochloric acid, and a ligand is bonded to the position of the chloro group. In this step, binding of a plurality of ligands can also be performed. For example, to immobilize another ligand Y on a nonwoven fabric on which a ligand X has been immobilized, the ligand Y is dissolved in distilled water to prepare a ligand Y aqueous solution, the ligand X-immobilized nonwoven fabric is added thereto, the solution is stirred for a predetermined period of time, and rinsing with distilled water multiple times and then drying, allowing to provide a nonwoven fabric with immobilized ligands X and Y. An example of the ligand X is heparin. An example of the ligand Y is lactoferrin.

<Cleaning Device>

A cleaning device according to an embodiment of the present invention is a device that includes the above-described fiber material for liquid purification. The cleaning device is, for example, a blood purifier. The fiber material for liquid purification is included inside the blood purifier as a fiber material for blood purification. Both the fiber material for blood purification and the blood purifier are autoclave resistant. Another example of the cleaning device includes a liquid cleaning device for purifying liquid pharmaceuticals or liquid pharmaceutical raw materials. Both the fiber material for liquid purification and the liquid cleaning device are autoclave resistant. Another example of the cleaning device includes a waste liquid cleaning device that prevents the discharge of biotoxic substances into the environment. The fiber material for liquid purification is included inside the waste liquid cleaning device as a fiber material for waste liquid purification. Both the fiber material for waste liquid purification and the waste liquid cleaning device are autoclave resistant.

FIG. 1 shows a longitudinal sectional view of a cleaning device according to an embodiment of the present invention.

A cleaning device 100 has, for example, the following structure. A container body 1 of the cleaning device 100 has a pipe 3 passed through a bottom 2 thereof and fixed by welding at a contact surface 4. An outlet 5 is provided at the top of the container body 1. An opening 6 and an inlet 7 are provided at both upper and lower ends of the pipe 3. The opening 6 is sealed by a stopper 9 provided on the partition plate 8. A flow path for guiding liquid is formed inside the pipe 3, and a large number of through holes 10 are provided in the peripheral wall. Between the partition plate 8 and an inner bottom surface 11 of the container body 1, a ligand-immobilized nonwoven fabric 12 is wrapped around the pipe 3 in multiple layers. A filter 13 is provided inside the outlet 5.

An example of using the cleaning device 100 is as follows. The liquid containing the biotoxic substance flows through the opening 7 through the flow path a1, passes through the flow path a2 inside the pipe, and is discharged from the through hole 10 in the radial direction. The liquid flows in the radial direction a3 through the multiple layers of the ligand-immobilized nonwoven fabric (corresponding to the fiber material for liquid purification) 12, then is purified, and passes through the gap a4 between the outermost layer of the nonwoven fabric 12 and the inner surface of the container body 1, and fine particles are removed by a filter 13. Thereby, the purified liquid is recovered from an outlet 5 (a5).

According to the above embodiment, it is possible to provide a fiber material for liquid purification, being inexpensive, capable of reducing cleaning, and suppressing the generation of fine particles, and a cleaning device comprising the same. In addition, according to a part of the above embodiment, it is possible to provide a fiber material for liquid purification, having excellent adsorption performance of the biotoxic components, and a cleaning device comprising the same.

EXAMPLES

Examples of the present invention will be described in detail using polymyxin immobilization as an example. The present invention is not limited to the following examples.

"Experiment 1"

(1) Production of Nonwoven Fabric

Production Example 1

There were mixed 60 parts by mass (6 kg) of a styrene-ethylene/butylene-styrene polymer (SEBS, product number MD1648, manufactured by Kraton Corporation) having 20% by mass of styrene residues and 80% by weight of ethylene/butylene residues, and 40 parts by mass (4 kg) of polypropylene (product number MOPLEN HP461X, manufactured by LyondellBasell Industries Holding B. V.), and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric A". Measurement of the amount of chlorine in the nonwoven fabric A by combustion ion chromatography found less than 0.001 w/w % (0.2 μmol/g).

(2) Chlorination of Nonwoven Fabric

Production Example 2

In a polypropylene container (50 mL), 0.214 g of 2-chloro-N-(hydroxymethyl) acetamide (product number BLDP-05742, manufactured by BLD Pharm), 0.011 g of paraformaldehyde (product number 168-20955, manufactured by Fujifilm Wako Pure Chemical Industries, Ltd.), 20 ml of nitrobenzene (product number 143-01706, manufactured by Fujifilm Wako Pure Chemical Industries, Ltd.), 1 ml of 95% concentrated sulfuric acid (product number 192-04696, manufactured by Fujifilm Wako Pure Chemical Industries, Ltd.), and 1 g of a nonwoven fabric A were charged, and the mixture was inversely stirred for 3 hours at room temperature of 24° C. Then, the nonwoven fabric was taken out from the container, cleaned with distilled water and methanol, and then the remaining cleaning liquid was removed by drying in a vacuum dryer at 85° C. to provide a chlorinated nonwoven fabric A. Measurement of the amount of chlorine in the nonwoven fabric by combustion ion chromatography found that the amount of chlorine was 0.151 w/w % (43 μmol/g).

Production Example 3

The nonwoven fabric A was chlorinated to provide a chlorinated nonwoven fabric B under the same conditions as in Production Example 2 except that the amount of concentrated sulfuric acid was increased to 2 ml. Measurement of the amount of chlorine in the nonwoven fabric by combustion ion chromatography found that the amount of chlorine was 0.131 w/w % (37 μmol/g).

Production Example 4

The nonwoven fabric A was chlorinated to provide a chlorinated nonwoven fabric C under the same conditions as in Production Example 3 except that the amount of concentrated sulfuric acid was increased to 15 ml. Measurement of the amount of chlorine in the nonwoven fabric by combustion ion chromatography found that the amount of chlorine was 0.096 w/w % (27 μmol/g).

Production Example 5

In a Pyrex® container (50 mL), there were charged 0.214 g of 2-chloro-N-(hydroxymethyl) acetamide (same as Production Example 2), 0.011 g of paraformaldehyde (same as Production Example 2), 20 ml of nitrobenzene (same as Production Example 2), 2 mL of 95% concentrated sulfuric acid (same as Production Example 2), and 1 g of the nonwoven fabric A, and the mixture was stirred using a magnetic stirrer and reacted at room temperature of 24° C. Then, the nonwoven fabric was taken out, cleaned with distilled water and methanol, and the remaining cleaning liquid was removed by drying in a vacuum dryer at 85° C. to provide a chlorinated nonwoven fabric D. Measurement of the amount of chlorine in the nonwoven fabric by combustion ion chromatography found that the amount of chlorine was 0.095 w/w % (27 μmol/g).

Production Example 6

In a Pyrex® container (50 mL), there were charged 0.214 g of 2-chloro-N-(hydroxymethyl) acetamide (same as Production Example 2), 0.011 g of paraformaldehyde (same as Production Example 2), 20 ml of nitrobenzene (same as Production Example 2), 2 ml of 95% concentrated sulfuric acid (same as Production Example 2), and 1 g of the nonwoven fabric A, and the mixture was stirred and reacted using a magnetic stirrer in a water bath at 24° C. Then, the nonwoven fabric was taken out, cleaned with distilled water and methanol, and then the remaining cleaning liquid was removed by drying in a vacuum dryer at 85° C. to provide a chlorinated nonwoven fabric E. Measurement of the amount of chlorine in the nonwoven fabric by combustion ion chromatography found that the amount of chlorine was 0.073 w/w& (21 μmol/g).

Production Example 7

A chlorinated nonwoven fabric F was obtained under the same conditions as Production Example 6 except that the temperature in the water bath was set at 20° C. Measurement of the amount of chlorine in the nonwoven fabric by combustion ion chromatography found that the amount of chlorine was 0.039 w/w % (11 μmol/g).

Production Example 8

A chlorinated nonwoven fabric G was obtained under the same conditions as Production Example 6 except that the temperature in the water bath was set at 14° C. Measurement of the amount of chlorine in the nonwoven fabric by combustion ion chromatography found that the amount of chlorine was 0.019 w/w % (5 μmol/g).

Production Example 9

A chlorinated nonwoven fabric H was obtained under the same conditions as Production Example 6 except that the temperature in the water bath was set at 5° C. Measurement of the amount of chlorine in the nonwoven fabric by combustion ion chromatography found that the amount of chlorine was 0.011 w/w % (3 μmol/g).

Production Example 9A

A chlorinated nonwoven fabric H' was obtained under the same conditions as Production Example 6 except that the temperature in the water bath was set at 50° C. Measurement of the amount of chlorine in the nonwoven fabric by combustion ion chromatography found that the amount of chlorine was 0.52 w/w % (146 μmol/g).

(3) Polymyxinization of Chlorinated Nonwoven Fabric

Example 1

In the polypropylene container used in Production Example 2, there was weighed 15 mg of polymyxin B sulfate (product number 1-800-364-9897, manufactured by Cayman Chemical Company), to which 15 ml of distilled water was added, and was dissolved. To the reaction solution, 1 g of the chlorinated nonwoven fabric B and 2 mg of magnesium oxide for pH adjustment (product number 131-00282, manufactured by Fuji Film Wako Pure Chemical Industries, Ltd.) were charged, and the mixture was inversely stirred at room temperature of 25° C. for 2 hours to be reacted. Then, the nonwoven fabric was taken out, cleaned with hydrochloric acid and distilled water, and then dried in a blow dryer at 40° C. for 3 hours to provide a polymyxin-supported nonwoven fabric A.

Example 2

A polymyxin-supported nonwoven fabric B was obtained under the same conditions as in Example 1 except that the amount of polymyxin B sulfate was set to 1 mg.

Example 3

A polymyxin-supported nonwoven fabric C was obtained under the same conditions as in Example 1 except that the chlorinated nonwoven fabric G was used and the amount of polymyxin B sulfate was set to 1 mg.

Example 4

A polymyxin-supported nonwoven fabric D was obtained under the same conditions as in Example 1 except that the amount of polymyxin B sulfate was set to 0.05 mg.

"Property Evaluation 1"

Various properties of polymyxin-supported nonwoven fabrics A, B, C, and D were evaluated. As a comparative material, "Toremixin PMX-20R" manufactured by Toray Industries, Inc. was used. "Toremixin PMX-20R" by Toray Industries, Inc. does not have a non-woven fabric structure, is made of polypropylene coated with styrene in the form of a knitted fiber. For this reason, a lot of chlorine was contained.

(1) Amount of Polymyxin Added During Reaction

Table 1 shows the amount of polymyxin added when producing various polymyxin-supported nonwoven fabric samples.

TABLE 1

| Sample | A | B | C | D |
|---|---|---|---|---|
| Amount of polymyxin added during reaction (mg/g-fiber) | 15 | 1 | 1 | 0.05 |

(2) Fine Particle Measurement

Table 2 shows a comparison of the number of fine particles generated when the polymyxin-supported nonwoven fabric B and the comparative material were subjected to two types of treatments. The objects to be measured were 0.17 g of each of the polymyxin-supported nonwoven fabric B and the comparative material cut into 2 cm squares. Each sample was placed in a 50 ml vial and these were cleaned by rinsing them 10 times with 10 ml of physiological saline. As a result, fibrils generated during cutting were removed. Then, after drying each sample, 10 ml of physiological saline was added, and the mixture was inversely stirred for 2 hours using a rotator (rotation speed: 10 rpm). As another method, after drying each sample, 10 ml of physiological saline was added and ultrasonic cleaning (frequency: 40 kHz) was performed for 20 minutes. The samples treated by these two methods were then diluted and subjected to a particle counter (model number: HIAC 9703+, manufactured by Beckman Coulter, Inc. The same applies to subsequent fine particle measurements).

TABLE 2

| Particle | Stirring by rotator | | Ultrasonic cleaning treatment | |
|---|---|---|---|---|
| size (μm) | Comparative material | B | Comparative material | B |
| 1.2-1.5 | 211298 | 2149 | 1569357 | 9028 |
| 1.5-2 | 141616 | 3106 | 1033976 | 6235 |
| 2-3 | 49353 | 1200 | 345098 | 2157 |
| 3-5 | 72447 | 1679 | 508808 | 4502 |
| 5-10 | 47628 | 416 | 297329 | 2141 |
| 10-15 | 7878 | 55 | 51949 | 55 |
| 15-20 | 843 | 0 | 6757 | 0 |
| 20-25 | 874 | 39 | 580 | 63 |
| 25-30 | 0 | 8 | 580 | 0 |
| 30-35 | 0 | 0 | 0 | 0 |
| 35-40 | 0 | 0 | 0 | 71 |
| 40-45 | 0 | 0 | 0 | 0 |
| 45-50 | 0 | 0 | 294 | 0 |
| 50-100 | 0 | 0 | 0 | 24 |
| 100-150 | 0 | 0 | 0 | 0 |

As is clear from Table 2, in both cases of the two types of treatments, it was found that the sample B generated fewer fine particles than the comparative material.

(3) Chlorine Amount

Table 3 shows a comparison of the chlorine amounts of various samples A, B, C, D and the comparative material. The amount of chlorine was measured by combustion ion chromatography. Specifically, the sample was burned and sucked using a combustion-suction system (model number SQ-10) manufactured by Yanaco LID Co., Ltd., and separation and analysis were performed using an ion chromatography system (model number ICA2000) manufactured by DKK-TOA Corporation and a column (TSK-gel Super IC-Anion HS). The same applies to subsequent measurements of the amount of chlorine.

TABLE 3

| | Sample | | | | |
|---|---|---|---|---|---|
| | A | B | C | D | Comparative material |
| Chlorine amount before supporting of polymyxin (w/w %) | 0.1310 | 0.1310 | 0.0185 | 0.1310 | ≥8.62 |
| Chlorine amount after supporting of polymyxin and autoclaving (w/w %) | 0.1111 | 0.1033 | 0.0056 | 0.0883 | 8.62 |
| Chlorine amount before supporting of polymyxin (μmol/g) | 37 | 37 | 5 | 37 | ≥2431 |
| Chlorine amount after supporting of polymyxin and autoclaving (μmol/g) | 31 | 29 | 2 | 25 | 2431 |

As is clear from Table 3, it was found that all of the samples A, B, C, and D contained less chlorine than the comparative material.

(4) Change in pH after Autoclaving

The sample B and comparative material of each 100 mg were cleaned with ion-exchanged water, then dried, and subjected to sterilization treatment (121° C., 20 min) in an autoclave (model number: HV-85IILV, manufactured by Hirayama Manufacturing Corporation. The same applies to subsequent autoclaves) in 10 ml of physiological saline. As a result of examining the change in pH of the physiological saline before and after sterilization, the pH of the physiological saline of the sample B changed from 7.2 to 6.9. The pH of the physiological saline of the comparative material changed from 7.2 to 3.7. The pH measuring device used was model number HI 2020-01, manufactured by Hanna Instruments, Inc. The same applies to subsequent pH measurements. From this result, it is considered that in the sample D, the pH change of the physiological saline was smaller and the amount of dechlorination was smaller than that of the comparative material. This result showed that the sample B has the possibility of significantly simplifying the rinsing step before use as compared with the comparative material.

(5) Adsorption Capacity of Endotoxin in Water

Table 4 shows the result of adsorption treatment of endotoxin (100 EU/ml×20 ml) in water using 25 mg of various samples. The endotoxin adsorption capacity was measured by turbidimetric time analysis. For analysis, Limulus ES-2 Single Test Wako, manufactured by Fuji Film Wako Pure Chemical Industries, Ltd., was used as a reagent, and for measurement, Toxinometer ET-7000, manufactured by Fuji Film Wako Pure Chemical Industries, Ltd., was used. A similar method was used in subsequent examinations of adsorption capacity for endotoxin or other biotoxic substances. The removal rate (%) in the table is a value obtained by multiplying (blank concentration−measured concentration)/blank concentration by 100.

TABLE 4

| Sample | A | B | C | D | Comparative material |
|---|---|---|---|---|---|
| Removal rate after 2 hours (%) | 93 | 93 | 98 | 90 | 73 |
| Removal rate after 4 hours (%) | 99 | 99 | 99 | 99 | 89 |

Each of the samples A, B, C, and D also showed a higher removal rate than the comparative material in the 2-hour adsorption test and the 4-hour adsorption test.

(6) Adsorption Capacity for Endotoxin in Human Serum

Table 5 shows the result of adsorption treatment of endotoxin (100 EU/ml×3 ml) in human serum using 15 mg of various samples. The removal rate (%) in the table is a value obtained by multiplying (blank concentration−measured concentration)/blank concentration by 100.

TABLE 5

| Sample | A | B | C | D | Comparative material |
|---|---|---|---|---|---|
| Removal rate after 20 minutes (%) | 59 | 57 | 58 | 57 | 28 |
| Removal rate after 60 minutes (%) | 69 | 65 | 80 | 68 | 44 |

Each of the samples A, B, C, and D also showed a higher removal rate than the comparative material in a 20-minute adsorption test and a 60-minute adsorption test.

"Experiment 2"

(1) Production of Nonwoven Fabric

Production Example 10

A styrene-ethylene/butylene-styrene polymer (SEBS, product number G1657, manufactured by Kraton Corporation) of 60 parts by mass (6 kg) having 10% by weight of styrene residues and 90% by weight of ethylene/butylene residues, and 40 parts by mass (4 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric I". Measurement of the amount of chlorine in the nonwoven fabric I by combustion ion chromatography found less than 0.2 μmol/g.

(2) Chlorination of Nonwoven Fabric

Production Example 11

In a polypropylene container (50 mL), 0.214 g of 2-chloro-N-(hydroxymethyl) acetamide (product number BLDP-05742, manufactured by BLD Pharm), 0.068 g of paraformaldehyde (product number 168-20955, manufactured by Fujifilm Wako Pure Chemical Industries, Ltd.), 20 mL of nitrobenzene (product number 143-01706, manufactured by Fujifilm Wako Pure Chemical Industries, Ltd.), 2 mL of 95% concentrated sulfuric acid (product number 192-04696, manufactured by Fujifilm Wako Pure Chemical Industries, Ltd.), and 1 g of the nonwoven fabric I were charged, and the mixture was inversely stirred for 3 hours at room temperature of 25° C. Then, the nonwoven fabric was taken out from the container, cleaned with distilled water and methanol, and then dried in a blow dryer at 40° C. for 3 hours to provide a chlorinated nonwoven fabric I.

(3) Polymyxinization of Chlorinated Nonwoven Fabric

Example 5

In a polypropylene container (50 mL), there was weighed 15 mg of polymyxin B sulfate (product number 1-800-364-9897, manufactured by Cayman Chemical Company), to which 15 mL of distilled water was added, and was dissolved. To the reaction solution, 1 g of the chlorinated nonwoven fabric I and 2 mg of magnesium oxide for pH adjustment (product number 131-00282, manufactured by Fujifilm Wako Pure Chemical Industries, Ltd.) were added, and the mixture was inversely stirred for 2 hours at room temperature of 25° C. to be reacted. Then, the nonwoven fabric was taken out, cleaned with hydrochloric acid and distilled water, and then dried in a blow dryer at 40° C. for 3 hours to provide a polymyxin-supported nonwoven fabric I.

"Experiment 3"

(1) Production of Nonwoven Fabric

Production Example 12

A styrene-ethylene/butylene-styrene polymer (SEBS, product number MD1648, manufactured by Kraton Corporation) of 60 parts by mass (6 kg) having 20% by weight of styrene residues and 80% by weight of ethylene/butylene residues and 40 parts by mass (4 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric J." Measurement of the amount of chlorine in the nonwoven fabric J by combustion ion chromatography found less than 0.2 μmol/g.

(2) Chlorination of Nonwoven Fabric

Production Example 13

Chlorination was performed under the same conditions as in Production Example 11 except that 1 g of the nonwoven fabric J was added in place of 1 g of the nonwoven fabric I to provide a chlorinated nonwoven fabric J.

(3) Polymyxinization of Chlorinated Nonwoven Fabric

Example 6

Polymyxinization was performed under the same conditions as in Example 5 except that 1 g of the chlorinated nonwoven fabric J was used in place of 1 g of the chlorinated nonwoven fabric I to provide a polymyxin-supported nonwoven fabric J.

"Experiment 4"

(1) Production of Nonwoven Fabric

Production Example 14

A styrene-ethylene/propylene-styrene polymer (SEPS, product number Septon 2002, manufactured by Kuraray Co., Ltd.) of 60 parts by mass (6 kg) having 30% by weight of styrene residues and 70% by weight of ethylene/propylene residues and 40 parts by mass (4 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric K". Measurement of the amount of chlorine in the nonwoven fabric K by combustion ion chromatography found less than 0.2 μmol/g.

(2) Chlorination of Nonwoven Fabric

Production Example 15

Chlorination was performed under the same conditions as in Production Example 11 except that 1 g of the nonwoven fabric K was added in place of 1 g of the nonwoven fabric I to provide a chlorinated nonwoven fabric K.

(3) Polymyxinization of Chlorinated Nonwoven Fabric

Example 7

Polymyxinization was performed under the same conditions as in Example 5 except that 1 g of the chlorinated nonwoven fabric K was used in place of 1 g of the chlorinated nonwoven fabric I to provide a polymyxin-supported nonwoven fabric K.

"Experiment 5"

(1) Production of Nonwoven Fabric

Production Example 16

A styrene-ethylene/butylene-styrene polymer (SEBS, product number Tuftec H1517, manufactured by Asahi Kasei Corporation) of 60 parts by mass (6 kg) having 43% by weight of styrene residues and 57% by weight of ethylene/butylene residues and 40 parts by mass (4 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric L". Measurement of the amount of chlorine in the nonwoven fabric L by combustion ion chromatography found less than 0.2 μmol/g.

(2) Chlorination of Nonwoven Fabric

Production Example 17

Chlorination was performed under the same conditions as in Production Example 11 except that 1 g of the nonwoven fabric L was added in place of 1 g of the nonwoven fabric I to provide a chlorinated nonwoven fabric L.

(3) Polymyxinization of Chlorinated Nonwoven Fabric

Example 8

Polymyxinization was performed under the same conditions as in Example 5 except that 1 g of the chlorinated nonwoven fabric L was used in place of 1 g of the chlorinated nonwoven fabric I to provide a polymyxin-supported nonwoven fabric L.

"Property Evaluation 2"

Various properties of the polymyxin-supported nonwoven fabrics I, J, K, and L were evaluated. As a comparative material, "Toremixin PMX-20R" manufactured by Toray Industries, Inc. was used. In the property evaluation 2, conditions not described in particular are the same conditions as the property evaluation 1.

(1) Fine Particle Measurement

Tables 6 and 7 show a comparison of the number of fine particles generated when two types of treatments were applied to the polymyxin-supported nonwoven fabrics I, J, K, and L and the comparative material. The objects to be measured were four types of polymyxin-supported nonwoven fabrics cut into 2 cm squares and one type of comparative material. Each sample was placed in a 50 mL vial and cleaned by rinsing them 10 times with 10 mL of physiological saline. As a result, fibrils generated during cutting were removed. Then, after drying each sample, 10 mL of physiological saline was added, and the mixture was inversely stirred for 2 hours using a rotator (rotation speed: 10 rpm). As another method, after drying each sample, 10 mL of physiological saline was added and ultrasonic cleaning (frequency: 40 kHz) was performed for 20 minutes. The samples treated with these two methods were then diluted and submitted to a particle counter. Table 6 shows the result of the sample that was inversely stirred with a rotator, and Table 7 shows the result of the sample that was ultrasonically cleaned. As is clear from Tables 6 and 7, in both cases of the two types of treatments, each sample of Examples 5 to 8 was found to generate fewer fine particles than the comparative material.

TABLE 6

| Particle size | Blank | Example 5 (I) | Example 6 (J) | Example 7 (K) | Example 8 (L) | Comparative material |
|---|---|---|---|---|---|---|
| 1.2 μm or more and 1.5 μm or less | 2376 | 1459 | 2337 | 13224 | 918 | 211298 |
| 1.5 μm or more and 2 μm or less | 306 | 494 | 2216 | 4494 | 94 | 141616 |
| 2 μm or more and 3 μm or less | 376 | 353 | 776 | 4682 | 24 | 49353 |
| 3 μm or more and 5 μm or less | 188 | 71 | 1086 | 2400 | 71 | 72447 |
| 5 μm or more and 10 μm or less | 47 | 118 | 365 | 612 | 0 | 47628 |
| 10 μm or more and 15 μm or less | 0 | 0 | 59 | 47 | 0 | 7878 |
| 15 μm or more and 20 μm or less | 0 | 0 | 4 | 24 | 0 | 843 |
| 20 μm or more and 25 μm or less | 0 | 0 | 24 | 0 | 0 | 874 |
| 25 μm or more and 30 μm or less | 0 | 0 | 8 | 24 | 0 | 0 |
| 30 μm or more and 35 μm or less | 0 | 0 | 0 | 0 | 0 | 0 |
| 35 μm or more and 40 μm or less | 0 | 0 | 0 | 0 | 0 | 0 |
| 40 μm or more and 45 μm or less | 0 | 0 | 0 | 0 | 0 | 0 |
| 45 μm or more and 50 μm or less | 0 | 0 | 0 | 0 | 0 | 0 |
| 50 μm or more and 100 μm or less | 0 | 0 | 4 | 0 | 0 | 0 |
| 100 μm or more and 150 μm or less | 47 | 0 | 0 | 0 | 0 | 0 |

TABLE 7

| Particle size | Blank | Example 5 (I) | Example 6 (J) | Example 7 (K) | Example 8 (L) | Comparative material |
|---|---|---|---|---|---|---|
| 1.2 μm or more and 1.5 μm or less | 2635 | 6682 | 13788 | 452847 | 6565 | 1569357 |
| 1.5 μm or more and 2 μm or less | 565 | 2212 | 9906 | 123624 | 2447 | 1033976 |
| 2 μm or more and 3 μm or less | 376 | 1741 | 3529 | 129271 | 2565 | 345098 |
| 3 μm or more and 5 μm or less | 141 | 1106 | 6282 | 39341 | 1129 | 508808 |
| 5 μm or more and 10 μm or less | 24 | 282 | 2753 | 4424 | 212 | 297329 |
| 10 μm or more and 15 μm or less | 71 | 47 | 165 | 612 | 47 | 51949 |
| 15 μm or more and 20 μm or less | 0 | 24 | 0 | 94 | 71 | 6757 |
| 20 μm or more and 25 μm or less | 0 | 0 | 71 | 0 | 0 | 580 |
| 25 μm or more and 30 μm or less | 0 | 0 | 0 | 0 | 0 | 580 |

TABLE 7-continued

| Particle size | Blank | Example 5 (I) | Example 6 (J) | Example 7 (K) | Example 8 (L) | Comparative material |
|---|---|---|---|---|---|---|
| 30 μm or more and 35 μm or less | 0 | 0 | 0 | 0 | 0 | 0 |
| 35 μm or more and 40 μm or less | 0 | 0 | 71 | 0 | 0 | 0 |
| 40 μm or more and 45 μm or less | 0 | 0 | 0 | 0 | 0 | 0 |
| 45 μm or more and 50 μm or less | 0 | 0 | 0 | 0 | 0 | 294 |
| 50 μm or more and 100 μm or less | 0 | 0 | 24 | 0 | 0 | 0 |
| 100 μm or more and 150 μm or less | 0 | 0 | 0 | 0 | 0 | 0 |

(2) Amount of Chlorine

Table 8 shows a comparison of the chlorine amounts of the polymyxin-supported nonwoven fabrics I, J, K, and L and the comparative material after autoclaving. The amount of chlorine was measured by combustion ion chromatography. As is clear from Table 8, each sample of Examples 5 to 8 was found to contain a smaller amount of chlorine than the comparative material.

TABLE 8

| | Example 5 (I) | Example 6 (J) | Example 7 (K) | Example 8 (L) | Comparative material |
|---|---|---|---|---|---|
| Chlorine content [μmol/g] | 40 | 27 | 508 | 229 | 2431 |

(3) Change in pH after Autoclaving

Table 9 shows the pH changes in physiological saline before and after the polymyxin-supported nonwoven fabrics I, J, and L and the comparative material were subjected to autoclave sterilization treatment in physiological saline. Each 100 mg of the polymyxin-supported nonwoven fabrics and the comparative material were cleaned with ion-exchanged water, dried, and then subjected to autoclave sterilization treatment (121° C., 20 min) in 10 mL of physiological saline. The physiological saline before and after sterilization was subjected to a pH meter. These results showed that the sample of each example had the possibility of greatly simplifying the rinsing step before use as compared with the comparative material.

TABLE 9

| | Example 5 (I) | Example 6 (J) | Example 8 (L) | Comparative material |
|---|---|---|---|---|
| Before autoclaving | 7.2 | 7.2 | 7.2 | 7.2 |
| After autoclaving | 6.1 | 6.9 | 4.8 | 3.7 |

(4) Adsorption Capacity of Endotoxin in Water

Table 10 shows the result of adsorption treatment of endotoxin in water (100 EU/mL×20 mL) on each 25 mg of polymyxin-supported nonwoven fabrics I, J, K and comparative material after autoclaving. The adsorption (%) in the table is a value obtained by multiplying (blank concentration−measured concentration)/blank concentration by 100. "Adsorption" may also be referred to as "removal rate". As is clear from Table 10, the sample of each example was found to have higher adsorption capacity than the comparative material.

TABLE 10

| | Example 5 (I) | Example 6 (J) | Example 7 (K) | Comparative material |
|---|---|---|---|---|
| Adsorption of endotoxin in water | 99% | 99% | 79% | 73% |

(5) Adsorption Capacity for Endotoxin in Human Serum

Table 11 shows the result of adsorption treatment of endotoxin in serum (100 EU/mL×3 mL) on each 15 mg of the polymyxin-supported nonwoven fabric J and the comparative material after autoclaving. The adsorption (%) in the table is a value obtained by multiplying (blank concentration−measured concentration)/blank concentration by 100. "Adsorption" may also be referred to as "removal rate". As is clear from Table 11, the sample of each example was found to have higher adsorption capacity than the comparative material.

TABLE 11

| | Example 6 (J) | Comparative material |
|---|---|---|
| Adsorption of endotoxin | 58% | 28% |

"Experiment 6"

(1) Production of Nonwoven Fabric

Production Example 18

A styrene-ethylene/butylene-styrene polymer (SEBS, product number G1657, manufactured by Kraton Corporation) of 20 parts by mass (2 kg) having 10% by weight of styrene residues and 90% by weight of ethylene/butylene residues and 80 parts by mass (8 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric M". Measurement of the amount of chlorine in the nonwoven fabric M by combustion ion chromatography found less than 0.2 μmol/g.

(2) Chlorination of Nonwoven Fabric

Production Example 19

In a polypropylene container (50 mL), 0.214 g of 2-chloro-N-(hydroxymethyl) acetamide (product number BLDP-05742, manufactured by BLD Pharm), 0.068 g of paraformaldehyde (product number 168-20955, manufactured by Fujifilm Wako Pure Chemical Industries, Ltd.), 20 mL of nitrobenzene (product number 143-01706, manufactured by Fujifilm Wako Pure Chemical Industries, Ltd.), 2 mL of 95% concentrated sulfuric acid (product number 192-04696, manufactured by Fujifilm Wako Pure Chemical Industries, Ltd.), and 1 g of the nonwoven fabric M were charged, and the mixture was inversely stirred for 3 hours at room temperature of 25° C. Then, the nonwoven fabric was taken out from the container, cleaned with distilled water and methanol, and then dried in a blow dryer at 40° C. for 3 hours to provide a chlorinated nonwoven fabric M.

(3) Polymyxinization of Chlorinated Nonwoven Fabric

Example 9

In a polypropylene container (50 mL), there was weighed 15 mg of polymyxin B sulfate (product number 1-800-364-9897, manufactured by Cayman Chemical Company), to which 15 mL of distilled water was added, and was dissolved. To the reaction solution, 1 g of the chlorinated nonwoven fabric M and 2 mg of magnesium oxide for pH adjustment (product number 131-00282, manufactured by Fujifilm Wako Pure Chemical Industries, Ltd.) were charged, and the mixture was inversely stirred for 2 hours at room temperature of 25° C. to be reacted. Then, the nonwoven fabric was taken out, cleaned with hydrochloric acid and distilled water, and then dried in a blow dryer at 40° C. for 3 hours to provide a polymyxin-supported nonwoven fabric M.

"Experiment 7"

(1) Production of Nonwoven Fabric

Production Example 20

A styrene-ethylene/butylene-styrene polymer (SEBS, product number MD1648, manufactured by Kraton Corporation) of 20 parts by mass (2 kg) having 20% by weight of styrene residues and 80% by weight of ethylene/butylene residues and 80 parts by mass (8 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric N". Measurement of the amount of chlorine in the nonwoven fabric N by combustion ion chromatography found less than 0.2 μmol/g.

(2) Chlorination of Nonwoven Fabric

Production Example 21

Chlorination was performed under the same conditions as in Production Example 19 except that 1 g of the nonwoven fabric N was added in place of 1 g of the nonwoven fabric M to provide a chlorinated nonwoven fabric N.

(3) Polymyxinization of Chlorinated Nonwoven Fabric

Example 10

Polymyxinization was performed under the same conditions as in Example 9 except that 1 g of the chlorinated nonwoven fabric N was used in place of 1 g of the chlorinated nonwoven fabric M to provide a polymyxin-supported nonwoven fabric N.

"Experiment 8"

(1) Production of Nonwoven Fabric

Production Example 22

A styrene-ethylene/butylene-styrene polymer (SEBS, product number MD1648, manufactured by Kraton Corporation) of 90 parts by mass (9 kg) having 20% by weight of styrene residues and 80% by weight of ethylene/butylene residues and 10 parts by mass (1 kg) of polypropylene (product number PWH02N, manufactured by Sun Allomer Ltd.) were mixed, and the melt blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric O". Measurement of the amount of chlorine in the nonwoven fabric O by combustion ion chromatography found less than 0.2 μmol/g.

(2) Chlorination of Nonwoven Fabric

Production Example 23

Chlorination was performed under the same conditions as in Production Example 19 except that 1 g of the nonwoven fabric O was added in place of 1 g of the nonwoven fabric M to provide a chlorinated nonwoven fabric O.

(3) Polymyxinization of Chlorinated Nonwoven Fabric

Example 11

Polymyxinization was performed under the same conditions as in Example 9 except that 1 g of the chlorinated nonwoven fabric O was used in place of 1 g of the chlorinated nonwoven fabric M to provide a polymyxin-supported nonwoven fabric O.

"Experiment 9"

(1) Production of Nonwoven Fabric

Production Example 24

A styrene-ethylene/butylene-styrene polymer (SEBS, product number MD1648, manufactured by Kraton Corporation) of 95 parts by mass (9.5 kg) having 20% by weight of styrene residues and 80% by weight of ethylene/butylene residues and 5 parts by mass (0.5 kg) of polypropylene (product number PWH02N, manufactured by Sun Allomer Ltd.) were mixed, and the melt-blown method with the device ALM-MB manufactured by AIKI Riotech Corporation was used to produce a spun and nonwoven fabric (length 3000 mm×width 250 mm×thickness 0.3 mm). This nonwoven fabric is referred to as "nonwoven fabric P". Measurement of the amount of chlorine in the nonwoven fabric P by combustion ion chromatography found less than 0.2 μmol/g.

(2) Chlorination of Nonwoven Fabric

Production Example 25

Chlorination was performed under the same conditions as in Production Example 19 except that 1 g of the nonwoven fabric P was added in place of 1 g of the nonwoven fabric M to provide a chlorinated nonwoven fabric P.

(3) Polymyxinization of Chlorinated Nonwoven Fabric

Comparative Example 1

Polymyxinization was performed under the same conditions as in Example 9 except that 1 g of the chlorinated nonwoven fabric P was used in place of 1 g of the chlorinated nonwoven fabric M to provide a polymyxin-supported nonwoven fabric P. The polymyxin-supported nonwoven fabric P had strong adhesion between the nonwoven fabrics and failed to be rolled up into a blood purification column, and failed to be used for the property evaluation.

"Experiment 10"

(1) Chlorination of Nonwoven Fabric

In a polypropylene container, 4.84 g of 2-chloro-N-(hydroxymethyl) acetamide, a halogen compound, 1.54 g of paraformaldehyde, 339 ml of nitrobenzene, and 45.2 ml of sulfuric acid were charged, 22.6 g of a nonwoven fabric consisting of styrene-olefin copolymer (product number MD1648 manufactured by Kraton Corporation:PP=9:1) was added, and the reaction was performed in shaking incubator at 25° C. and 160 rpm for 3 hours with stirring. Thereafter, cleaning was performed three times with 200 ml of distilled water and 6 times with 600 ml of methanol to remove residual nitrobenzene, and then cleaned three times with 500 ml of distilled water. Thereafter, drying was performed for 2 hours at 40° C. in a constant temperature blow dryer to provide a chlorinated nonwoven fabric Q into which chlorine groups were introduced.

Example 12

(2) Tryptophanization of Chlorinated Nonwoven Fabric

Figure 2:
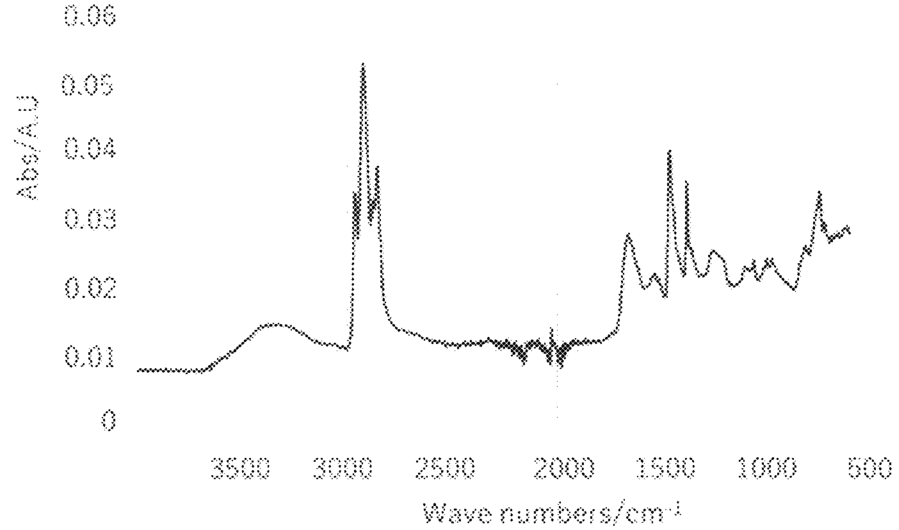
FIG. 2 shows a difference spectrum of a tryptophan-immobilized fiber.

An attempt was made to immobilize L-tryptophan (manufactured by Fuji Film Wako Pure Chemical Industries, Ltd.) on the chlorinated nonwoven fabric Q in the following manner. In a polypropylene container, 45 ml of 1 wt % tryptophan aqueous solution was charged, 300 mg of the chlorinated nonwoven fabric Q and 6 mg of magnesium oxide for pH adjustment were charged, and the mixture was inversely stirred for 2 hours at room temperature of 25° C. to be reacted. Then, the nonwoven fabric was taken out, cleaned with hydrochloric acid and distilled water, and then dried in a blow dryer at 40° C. for 3 hours to provide a tryptophan-introduced nonwoven fabric. As shown in FIG. 2, the introduction of tryptophan was confirmed by comparing the difference spectrum obtained by subtracting the IR spectrum obtained from the chlorinated fiber from the IR spectrum obtained from the tryptophan-introduced fiber using ATR-FT-IR (Nicolet FT-IR of Thermo Fisher Scientific Inc.) with tryptophan spectrum on database.

"Experiment 11"

Example 13

L-Arginination of Chlorinated Nonwoven Fabric

Figure 3:
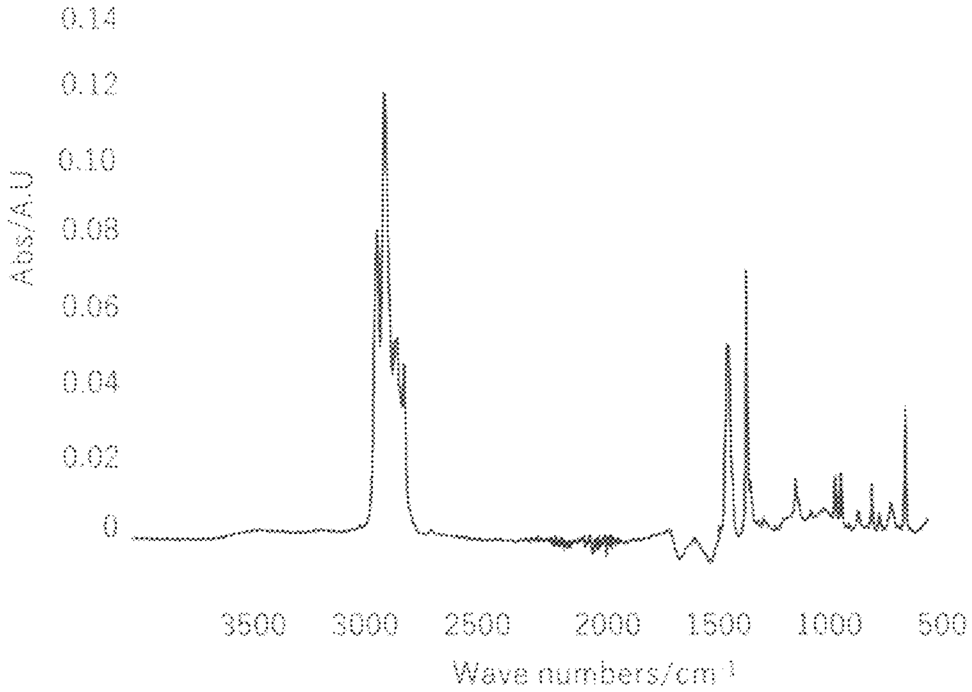
FIG. 3 shows a difference spectrum of an arginine-immobilized fiber.

An attempt was made to immobilize L(+)-arginine (manufactured by Fujifilm Wako Pure Chemical Industries, Ltd.) on the chlorinated nonwoven fabric Q in the following manner. In a polypropylene container, 45 ml of a 1 wt % arginine aqueous solution was charged, 300 mg of the chlorinated nonwoven fabric Q and 6 mg of magnesium oxide for pH adjustment were charged, and the mixture was inversely stirred at room temperature of 25° C. at around pH 9.4 for 2 hours to be reacted. Then, the nonwoven fabric was taken out, cleaned with hydrochloric acid and distilled water, and then dried in a blow dryer at 40° C. for 3 hours to provide an arginine-introduced nonwoven fabric. As shown in Table 12, measurement with SEM-EDS (model number: Miniscope TM3000, manufactured by Hitachi High-Technologies Corporation) on this nonwoven fabric confirmed introduction of N derived from arginine. Further, as shown in FIG. 3, the introduction of arginine was confirmed by comparing the difference spectrum obtained by subtracting the IR spectrum obtained from the chlorinated fiber from the IR spectrum obtained from the arginine-introduced fiber using ATR-FT-IR (Nicolet FT-IR of Thermo Fisher Scientific Inc.) with the arginine spectrum on database.

TABLE 12

Spectrum: Point

| Element | AN | Series | | Net unn. C [wt. %] | norm. C [wt. %] | Atom. C [at. %] |
|---|---|---|---|---|---|---|
| Carbon | 6 | K-series | 23516 | 74.02 | 74.02 | 77.62 |
| Nitrogen | 7 | K-series | 652 | 17.20 | 17.20 | 15.47 |
| Oxygen | 8 | K-series | 577 | 8.79 | 8.79 | 6.92 |
| Chlorine | 17 | K-series | 0 | 0.00 | 0.00 | 0.00 |
| | | | Total: | 100.00 | 100.00 | 100.00 |

"Experiment 12"

Example 14

Phenylalanization of Chlorinated Nonwoven Fabric

Figure 4:
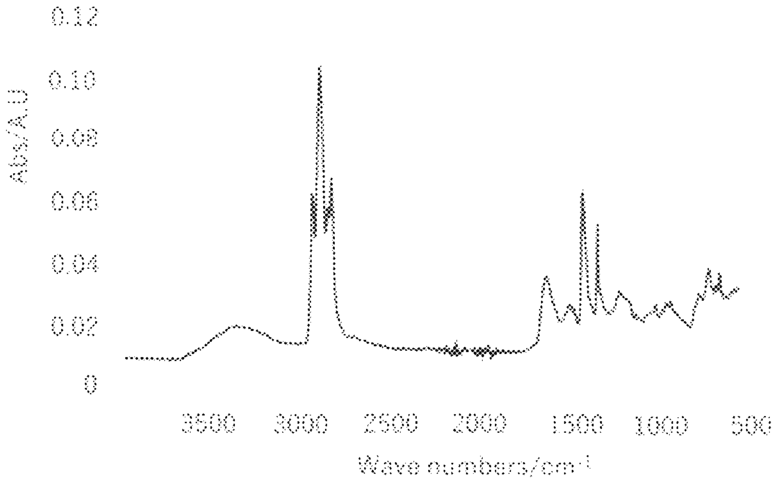
FIG. 4 shows a difference spectrum of a phenylalanine-immobilized fiber.

An attempt was made to immobilize phenylalanine (manufactured by Fujifilm Wako Pure Chemical Industries, Ltd.) on the chlorinated nonwoven fabric Q in the following manner. In a polypropylene container, 25 ml of a 1 wt % phenylalanine aqueous solution was charged, 1 g of the chlorinated nonwoven fabric Q and 4 mg of magnesium oxide for pH adjustment were charged, and the mixture was inversely stirred at 160 rpm for 48 hours at 45° C. to be reacted. Then, the nonwoven fabric was taken out and cleaned three times with 30 ml of 0.1N hydrochloric acid and three times with 50 ml of distilled water, and then cleaned three times with 30 ml of 0.018% Triton solution. In addition, suction filtration cleaning using 200 ml of 0.018% Triton solution and suction filtration cleaning using 200 ml distilled water were performed, and drying was performed for 2 hours in a blow dryer at 40° C. to provide a phenylalanine-introduced nonwoven fabric. As shown in FIG. 4, the introduction of phenylalanine was confirmed by comparing the difference spectrum obtained by subtracting the IR spectrum obtained from the chlorinated fiber from the IR spectrum obtained from the phenylalanine-introduced fiber using ATR-FT-IR (Nicolet FT-IR of Thermo Fisher Scientific Inc.) with the phenylalanine spectrum on database.

"Experiment 13"

Example 15

Monoethanol Amination of Chlorinated Nonwoven Fabric

Figure 5:
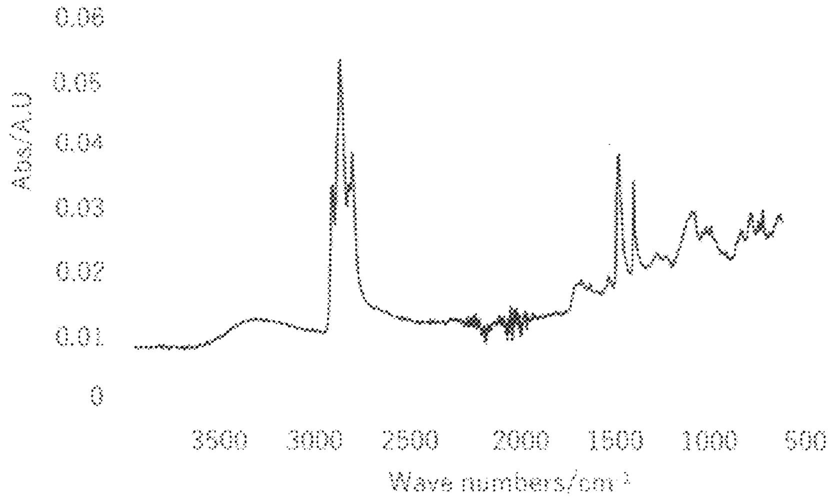
FIG. 5 shows a difference spectrum of a monoethanolamine-immobilized fiber.

An attempt was made to immobilize monoethanolamine (manufactured by Fujifilm Wako Pure Chemical Industries, Ltd.) on the chlorinated nonwoven fabric Q in the following manner. This corresponds to the introduction of OH groups into the chlorinated nonwoven fabric. In a polypropylene container, 25 ml of a 1 wt % monoethanolamine aqueous solution was charged, 1 g of the chlorinated nonwoven fabric Q and 4 mg of magnesium oxide for pH adjustment were charged, and the mixture was inversely stirred at 160 rpm for 48 hours at 45° C. to be reacted. Then, the nonwoven fabric was taken out and cleaned three times with 30 ml of 0.1N hydrochloric acid and three times with 50 ml of distilled water, and then cleaned three times with 30 ml of 0.018% Triton solution. In addition, suction filtration cleaning using 200 ml of 0.018% Triton solution and suction filtration cleaning using 200 ml distilled water were performed, and drying was performed in a blow dryer at 40° C. for 2 hours to provide an OH group-introduced nonwoven fabric. As shown in FIG. 5, the introduction of OH groups was confirmed by comparing the difference spectrum obtained by subtracting the IR spectrum obtained from the chlorinated fiber from the IR spectrum obtained from the monoethanolamine-introduced fiber using ATR-FT-IR (Nicolet FT-IR of Thermo Fisher Scientific Inc.) with the monoethanolamine spectrum on database.

"Experiment 14"

Example 16

Ethylenediamination of Chlorinated Nonwoven Fabric

Figure 6:
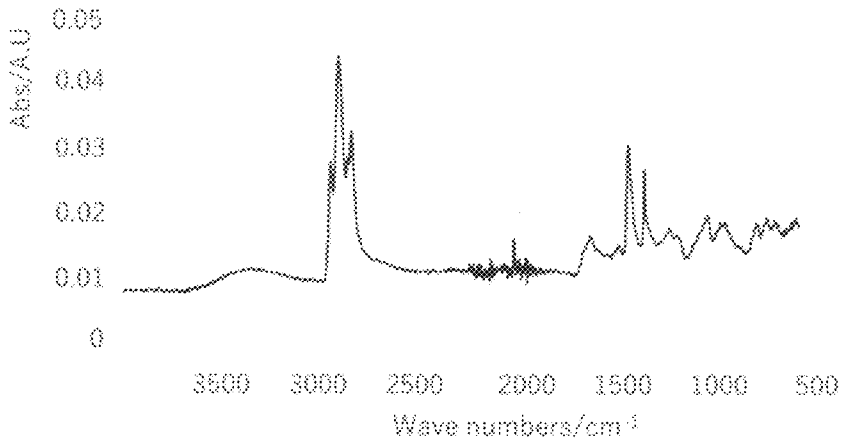
FIG. 6 shows a difference spectrum of an ethylenediamine-immobilized fiber.

An attempt was made to immobilize ethylenediamine (manufactured by Fujifilm Wako Pure Chemical Industries, Ltd.) on the chlorinated nonwoven fabric Q in the following manner. This corresponds to the introduction of amino groups into the chlorinated nonwoven fabric. In a polypropylene container, 25 ml of a 1 wt % ethylenediamine aqueous solution was charged, 1 g of the chlorinated nonwoven fabric Q and 4 mg of magnesium oxide for pH adjustment were charged, and the mixture was inversely stirred at 160 rpm for 48 hours at 45° C. to be reacted. Then, the nonwoven fabric was taken out and cleaned three times with 30 ml of 0.1N hydrochloric acid and three times with 50 ml of distilled water, and then cleaned three times with 30 ml of 0.018% Triton solution. In addition, suction filtration cleaning using 200 ml of 0.018% Triton solution and suction filtration cleaning using 200 ml distilled water were performed, and drying was performed in a blow dryer at 40° C. for 2 hours to provide an amino group-introduced nonwoven fabric. As shown in FIG. 6, the introduction of amino groups was confirmed by comparing the difference spectrum obtained by subtracting the IR spectrum obtained from the chlorinated fiber from the IR spectrum obtained from the ethylenediamine-introduced fiber using ATR-FT-IR (Nicolet FT-IR of Thermo Fisher Scientific Inc.) with the ethylenediamine on the database.

"Experiment 15"

Example 17

Heparinization of Chlorinated Nonwoven Fabric Using Ethylenediaminated Fiber

Figure 7:
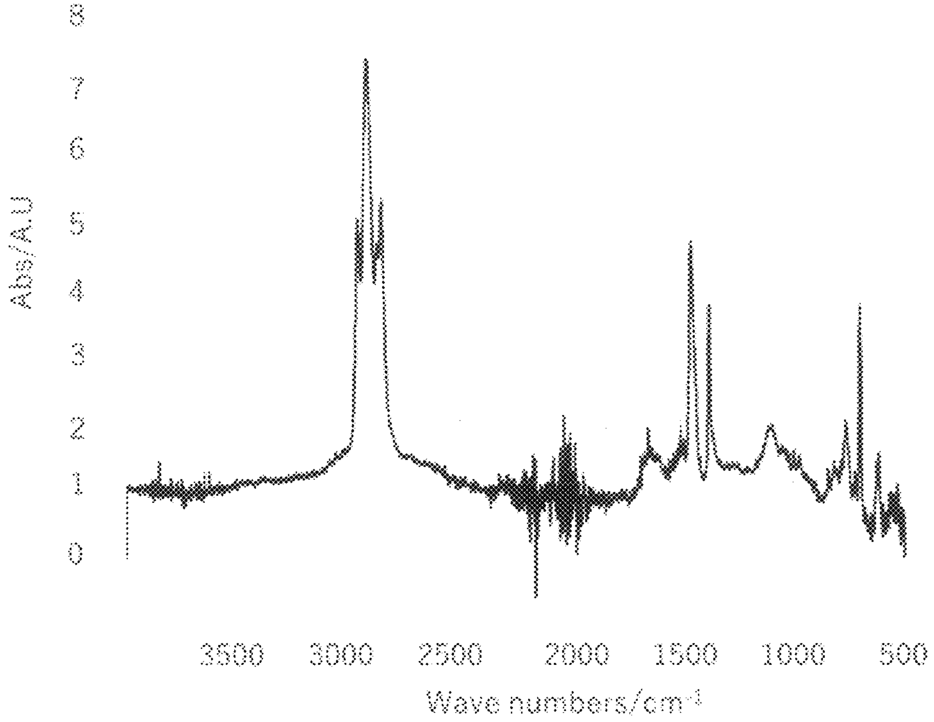
FIG. 7 shows a difference spectrum of a heparin-immobilized fiber.

An attempt was made to immobilize heparin on the amino group-introduced nonwoven fabric obtained in Example 16 of Experiment 14 in the following manner. In a 15 ml polypropylene container, 10 mg of heparin treated with sodium periodate (dialdehyde heparin) was charged, and 10 ml of an aqueous hydrochloric acid solution with pH=4 was added to make a 0.1 wt& solution (approximately 200 units/ml). To this solution, 100 mg of the amino group-introduced nonwoven fabric obtained in Example 16 was charged. After reaction at 25° C. for 24 hours at around pH=4 (vortexing at 100 rpm), the mixture was thoroughly cleaned with distilled water and dried for 3 hours in a blow dryer at 40° C. to provide a heparin-immobilized nonwoven fabric. As shown in FIG. 7, the introduction of heparin was confirmed by comparing the difference spectrum obtained by subtracting the IR spectrum obtained from the untreated fiber from the IR spectrum obtained from the heparin-introduced fiber using ATR-FT-IR (Nicolet FT-IR of Thermo Fisher Scientific Inc.) with the FT-IR spectrum of aldehyde heparin.

"Experiment 16"

Example 18

Azidization of Chlorinated Nonwoven Fabric

Figure 8:
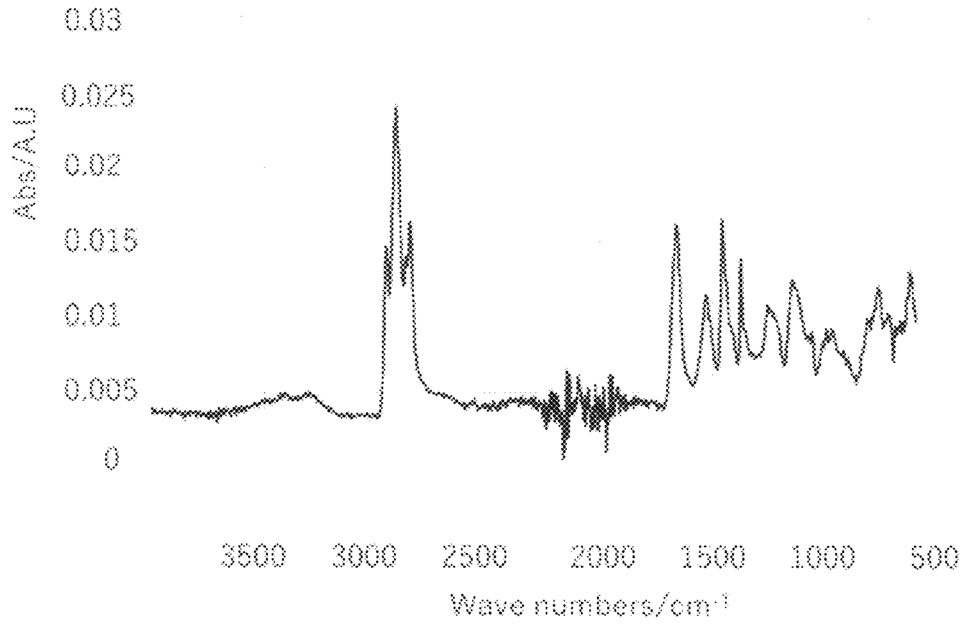
FIG. 8 shows a difference spectrum of an azide group-immobilized fiber.

An attempt was made to immobilize azide groups on the chlorinated nonwoven fabric Q in the following manner. In a 15 ml polypropylene container, 100 mg of sodium azide was charged, and then 10 ml of distilled water was added to make a 1 wt & aqueous solution. The chlorinated nonwoven fabric Q was charged to this solution. After reaction at around pH=8 at 25° C. for 24 hours (vortexing at 100 rpm), the mixture was thoroughly cleaned with distilled water and dried for 3 hours in a blow dryer at 40° C. to provide an azidized nonwoven fabric. As shown in FIG. 8, the introduction of the azide group was confirmed by comparing the ATR-FT-IR measurement result of the obtained nonwoven fabric in the same manner as in Experiment 14 with the spectrum of sodium azide on the database.

"Experiment 17"

Example 19

Lactoferrinization with Heparinized Fiber of Chlorinated Nonwoven Fabric

A functional protein that interacts with heparin was immobilized on a nonwoven fabric via immobilized heparin to develop a functional adsorbent. The heparin-immobilized nonwoven fabric synthesized in Example 17 of Experiment 15 not only has improved blood compatibility, but also interacts with many functional molecules, and can be used as a base for a highly functional fiber. Heparin is known to have a strong interaction with lactoferrin. This immobilizes lactoferrin, whereby LPS trap, virus trap, electrostatic interaction with LDL, and the like are expected.

Figure 9:
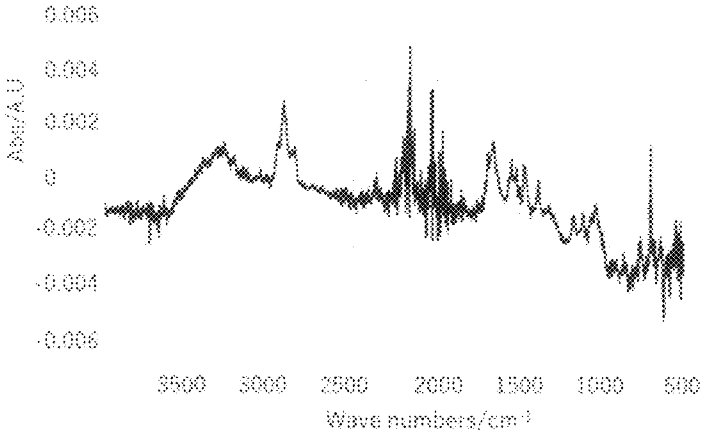
FIG. 9 shows a difference spectrum of a lactoferrin-heparin-immobilized fiber.

First, 100 mg of lactoferrin (derived from milk, Biochemical grade 129-04121, manufactured by Fujifilm Corporation) was dissolved in 10 ml of distilled water to prepare a 0.1 wt % lactoferrin aqueous solution (pale red color). Then, to this lactoferrin aqueous solution, 10 mg of the heparin-immobilized nonwoven fabric obtained in Example 17 was charged and immersed at room temperature for 4 hours while stirring at a speed of 40 rpm. After rinsing vigorously with 20 ml of distilled water five times using vortexing at 300 rpm, drying was performed at room temperature to provide a lactoferrin-heparin immobilized nonwoven fabric. As shown in FIG. 9, the introduction of lactoferrin was confirmed by comparing the difference spectrum obtained by subtracting the IR spectrum obtained from the heparin-introduced fiber from the IR spectrum obtained from the lactoferrin-introduced fiber using ATR-FT-IR (Nicolet FT-IR of Thermo Fisher Scientific Inc.) with the lactoferrin FT-IR spectrum.

"Experiment 18"

Example 20

Alkali Treatment Gelatinization of Chlorinated Nonwoven Fabric

Figure 10:
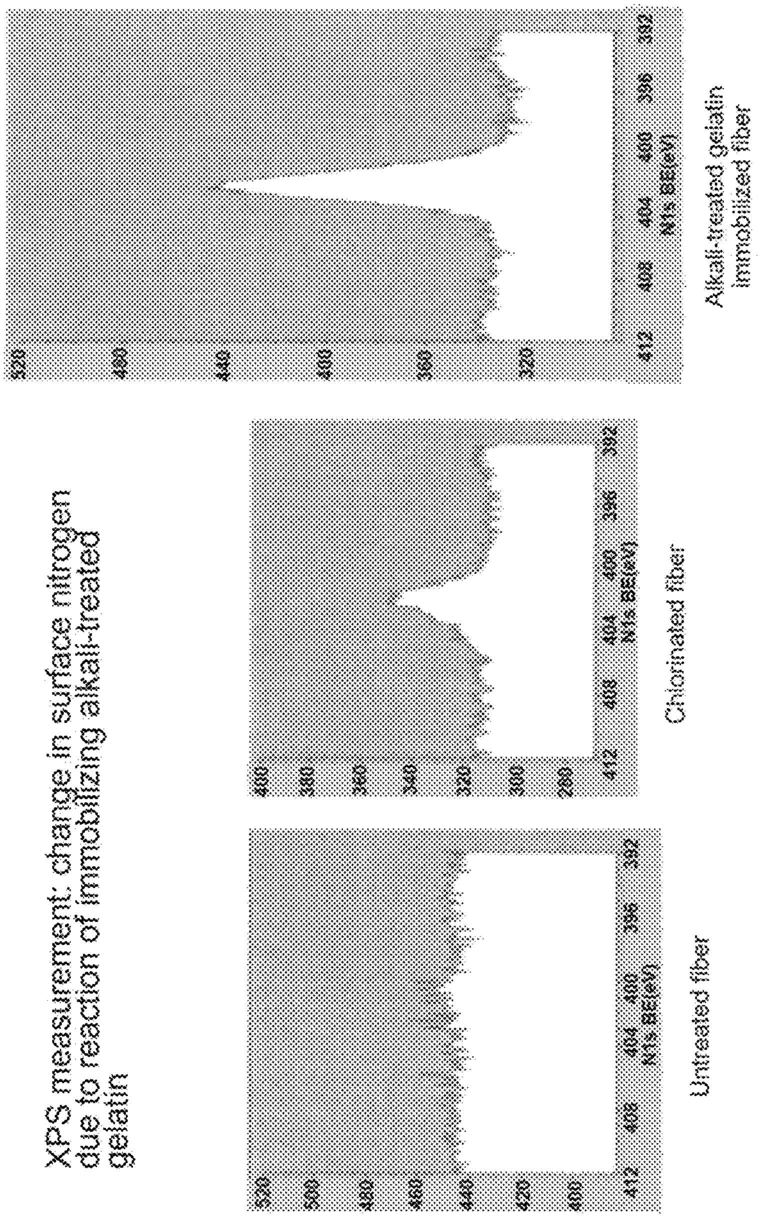
FIG. 10 shows a XPS measurement result in Experiment 19.

An alkali-treated gelatin was immobilized on the chlorinated nonwoven fabric Q in the following manner. As the gelatin, an alkali-treated beef bone gelatin (LET-N230)

manufactured by Nitta Gelatin Inc. was used. In a polypropylene container, 15 ml of a 1.6 wt % alkali-treated gelatin aqueous solution was charged, 100 mg of the chlorinated nonwoven fabric Q and 2 mg of magnesium oxide for pH adjustment were charged, and the mixture was inversely stirred at around pH=9.4 at room temperature of 25° C. for 2 hours to be reacted. Then, the nonwoven fabric was taken out, cleaned with hydrochloric acid and distilled water, and then dried in a blow dryer at 40° C. for 3 hours to provide an alkali-treated gelatin-introduced nonwoven fabric. As shown in Table 13, SEM-EDS (model number: Miniscope TM3000, manufactured by Hitachi High-Technologies Corporation) measurement of this nonwoven fabric confirmed the introduction of N derived from gelatin. As shown in FIG. 10, measurement of changes in the concentration of nitrogen derived from gelatin on the outermost surface using XPS (model number: JPS-9010MC, manufactured by JEOL Ltd.) confirmed the introduction of nitrogen at the outermost surface.

TABLE 13

| Spectrum: Point Element | AN Series | | Net unn. C [wt. %] | norm. C [wt. %] | Atom. C [at. %] |
|---|---|---|---|---|---|
| Carbon 6 | K-series | 522447 | 84.75 | 84.75 | 87.32 |
| Nitrogen 7 | K-series | 5295 | 8.49 | 8.49 | 7.50 |
| Oxygen 8 | K-series | 8276 | 6.64 | 6.64 | 5.13 |
| Chlorine 17 | K-series | 2183 | 0.12 | 0.12 | 0.04 |
| | | Total: | 100.00 | 100.00 | 100.00 |

"Experiment 19"

Example 21

Acid Treatment Gelatinization of Chlorinated Nonwoven Fabric

Figure 11:
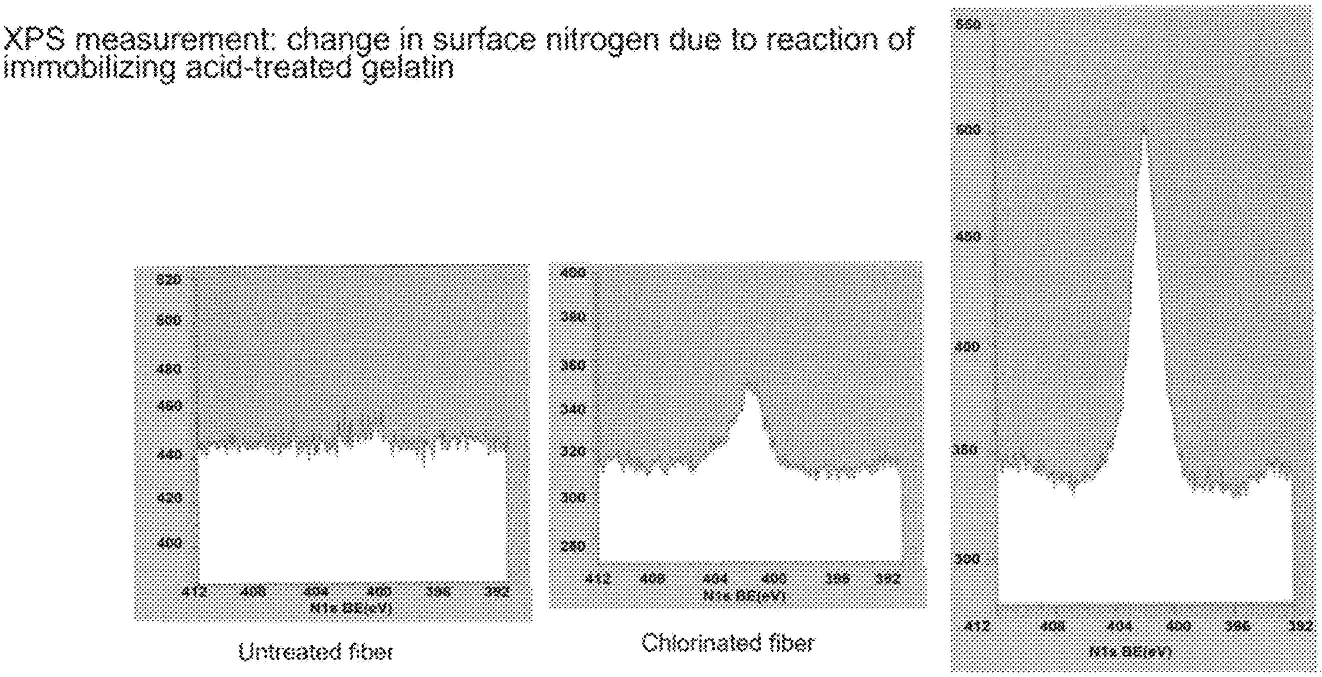
FIG. 11 shows a XPS measurement result in Experiment 20.

An acid-treated gelatin was immobilized on the chlorinated nonwoven fabric Q in the following manner. As the gelatin, an acid-treated pork skin gelatin (LET-NP250) manufactured by Nitta Gelatin Inc. was used. In a polypropylene container, 15 ml of a 1.6 wt % acid-treated gelatin aqueous solution was charged, and 100 mg of the chlorinated nonwoven fabric Q and 2 mg of magnesium oxide for pH adjustment were charged. The mixture was inversely stirred at around pH=9.4 for 2 hours at room temperature of 25° C. to be reacted. Then, the nonwoven fabric was taken out, cleaned with hydrochloric acid and distilled water, and then dried in a blow dryer at 40° C. for 3 hours to provide an acid-treated gelatin-introduced nonwoven fabric. As shown in Table 14, SEM-EDS (model number: Miniscope TM3000, manufactured by Hitachi High-Technologies Corporation) measurement of this nonwoven fabric confirmed the introduction of N derived from gelatin. As shown in FIG. 11, measurement of changes in the concentration of nitrogen derived from gelatin on the outermost surface using XPS (model number: JPS-9010MC, manufactured by JEOL Ltd.) confirmed the introduction of nitrogen at the outermost surface.

TABLE 14

| Spectrum: Point Element | AN Series | | Net unn. C [wt. %] | norm. C [wt. %] | Atom. C [at. %] |
|---|---|---|---|---|---|
| Carbon 6 | K-series | 192072 | 85.99 | 85.99 | 88.32 |
| Nitrogen 7 | K-series | 1949 | 8.78 | 8.78 | 7.73 |
| Oxygen 8 | K-series | 2223 | 5.03 | 5.03 | 3.87 |
| Chlorine 17 | K-series | 1309 | 0.20 | 0.20 | 0.07 |
| | | Total: | 100.00 | 100.00 | 100.00 |

"Property Evaluation 3"

The properties of the various ligand-supported nonwoven fabrics of Examples 9 to 21 were evaluated. As a comparative material, "Toremixin PMX-20R" manufactured by Toray Industries, Inc. was used. In the property evaluation 3, conditions not described in particular are the same conditions as the property evaluation 1.

(1) Fine Particle Measurement

Tables 15 and 16 show a comparison of the number of fine particles generated when two types of treatments were applied to various ligand-supported nonwoven fabrics and the comparative material. The treatment of the measurement object and the measurement method were the same as in the property evaluation 2. Table 15 shows the result of the sample that was inversely stirred with a rotator, and Table 16 shows the result of the sample that was ultrasonically cleaned. As is clear from Tables 15 and 16, in both cases of the two types of treatments, it was found that the sample of each example produced fewer fine particles than the comparative material.

TABLE 15

| Particle size | Example 9 | Example 10 | Example 12 | Example. 14 | Example 15 | Example 16 | Comparative material |
|---|---|---|---|---|---|---|---|
| 1.2 μm or more and 1.5 μm or less | 2471 | 3153 | 193 | 67 | 0 | 20 | 211298 |
| 1.5 μm or more and 2 μm or less | 847 | 847 | 60 | 10 | 1.3 | 23 | 141616 |
| 2 μm or more and 3 μm or less | 847 | 706 | 143 | 0 | 77 | 37 | 49353 |
| 3 μm or more and 5 μm or less | 1318 | 424 | 100 | 0 | 13 | 33 | 72447 |
| 5 μm or more and 10 μm or less | 776 | 212 | 60 | 0 | 7 | 0 | 47628 |
| 10 μm or more and 15 μm or less | 306 | 47 | 30 | 20 | 3 | 0 | 7878 |
| 15 μm or more and 20 μm or less | 212 | 24 | 13 | 3 | 0 | 6 | 843 |
| 20 μm or more and 25 μm or less | 0 | 0 | 13 | 0 | 3 | 10 | 874 |
| 25 μm or more and 30 μm or less | 0 | 0 | 0 | 0 | 3 | 0 | 0 |

TABLE 15-continued

| Particle size | Example 9 | Example 10 | Example 12 | Example. 14 | Example 15 | Example 16 | Comparative material |
|---|---|---|---|---|---|---|---|
| 30 μm or more and 35 μm or less | 24 | 24 | 0 | 0 | 0 | 0 | 0 |
| 35 μm or more and 40 μm or less | 0 | 0 | 3 | 0 | 0 | 3 | 0 |
| 40 μm or more and 45 μm or less | 0 | 0 | 0 | 0 | 0 | 0 | 0 |
| 45 μm or more and 50 μm or less | 0 | 0 | 7 | 0 | 0 | 10 | 0 |
| 50 μm or more and 100 μm or less | 0 | 0 | 0 | 0 | 0 | 0 | 0 |
| 100 μm or more and 150 μm or less | 0 | 24 | 0 | 0 | 0 | 3 | 0 |

TABLE 16

| Particle size | Example 9 | Example 10 | Example 12 | Example 34 | Example 15 | Example 16 | Comparative material |
|---|---|---|---|---|---|---|---|
| 1.2 μm.or more and 1.5 μm or less | 13647 | 19553 | 1400 | 2967 | 3433 | 2473 | 1569357 |
| 1.5 μm or more and 2 μm or less | 4165 | 6776 | 417 | 997 | 1037 | 613 | 1033976 |
| 2 μm or more and 3 μm or less | 5365 | 9624 | 143 | 1153 | 1203 | 660 | 345098 |
| 3 μm or more and 5 μm or less | 1576 | 8729 | 353 | 407 | 753 | 507 | 508808 |
| 5 μm or more and 10 μm or less | 212 | 5459 | 213 | 257 | 267 | 220 | 297329 |
| 10 μm or more and 15 μm or less | 94 | 918 | 157 | 53 | 37 | 57 | 51949 |
| 15 μm or more and 20 μm or less | 47 | 282 | 50 | 57 | 33 | 40 | 6757 |
| 20 μm or more and 25 μm or less | 0 | 24 | 37 | 23 | 7 | 13 | 580 |
| 25 μm or more and 30 μm or less | 0 | 47 | 10 | 7 | 3 | 7 | 580 |
| 30 μm or more and 35 μm or less | 0 | 0 | 10 | 0 | 0 | 6 | 0 |
| 35 μm or more and 40 μm or less | 0 | 0 | 3 | 0 | 0 | 3 | 0 |
| 40 μm or more and 45 μm or less | 0 | 0 | 3 | 3 | 0 | 0 | 0 |
| 45 μm or more and 50 μm or less | 24 | 0 | 0 | 10 | 0 | 13 | 294 |
| 50 μm or more and 100 μm or less | 0 | 0 | 0 | 3 | 0 | 3 | 0 |
| 100 μm or more and 150 μm or less | 0 | 0 | 0 | 0 | 0 | 0 | 0 |

(2) Amount of Chlorine

Table 17 shows a comparison of the chlorine amounts of the polymyxin-supported nonwoven fabrics M, N, O and the comparative material after autoclaving. The amount of chlorine was measured by combustion ion chromatography. As is clear from Table 17, each sample of Examples 9 to 11 was found to contain a smaller amount of chlorine than the comparative material.

TABLE 17

| | Example 9 (M) | Example 10 (N) | Example 11 (O) | Comparative material |
|---|---|---|---|---|
| Chlorine content [μmol/g] | 2 | 4 | 876 | 2431 |

(3) Change in pH after Autoclaving

Table 18 shows the pH changes in physiological saline before and after sterilizing various ligand-supported nonwoven fabrics and the comparative material by autoclaving in physiological saline. The treatment of the measurement object and the measurement conditions were the same as in the property evaluation 2. From this result, the sample of each example had smaller pH changes than the comparative materials. Therefore, the sample of each example showed the possibility of greatly simplifying the rinsing step before use.

TABLE 18

| | Before autoclaving | After autoclaving |
|---|---|---|
| Example 9 | 7.2 | 6.6 |
| Example 10 | 7.2 | 6.7 |
| Example 11 | 7.2 | 4.5 |
| Example 12 | 7.2 | 4.9 |
| Example 13 | 7.2 | 7.7 |
| Example 14 | 7.2 | 4.0 |
| Example 15 | 7.2 | 5.6 |

TABLE 18-continued

| | Before autoclaving | After autoclaving |
|---|---|---|
| Example 16 | 7.2 | 8.1 |
| Example 20 | 7.4 | 7.3 |
| Example 21 | 7.4 | 7.2 |
| Comparative material | 7.2 | 3.7 |

(4) Adsorption Capacity of Endotoxin in Water

Table 19 shows the result of measuring the amount of adsorption after 2 hours for the adsorption treatment in which each 5 mg of various ligand-supported nonwoven fabrics and the comparative material after autoclaving were immersed in 4 ml of ion-exchanged water adjusted to an endotoxin concentration of 100 EU/mL, while stirring at 37° C. and 10 rpm. The adsorption (%) in the table is a value obtained by multiplying (blank concentration−measured concentration)/blank concentration by 100.

TABLE 19

| | Ligand | Adsorption after 2 hours (%) |
|---|---|---|
| Example 9 | Polymyxin | 61 |
| Example 10 | Polymyxin | 99 |
| Example 11 | Polymyxin | 99 |
| Example 12 | Tryptophan | 60 |
| Example 15 | Monoethanolamine | 98 |
| Example 16 | Ethylenediamine | 97 |
| Example 17 | Heparin | 18 |
| Example 19 | Heparin-lactoferrin | 91 |
| Example 20 | Alkali-treated gelatin | 39 |
| Example 21 | Acid-treated gelatin | 98 |
| Comparative material | — | 73 |

In the nonwoven fabric into which amino acids had been introduced as ligands, the endotoxin adsorption mechanism was clearly observed. The nonwoven fabric on which tryptophan was immobilized, which had hydrophobic moieties and amino groups after immobilization, showed a relatively high endotoxin adsorption of about 60%. Considering this result, it has been estimated that endotoxin adsorption does not occur only due to charge, but multiple factors originating from the structure and chemical composition of the ligand are involved, particularly factors such as the charge portion, hydrophobic portion, and distance have a large influence on the strength of the interaction. It has been found that endotoxin can be adsorbed with high efficiency of 97% and 98% even in the nonwoven fabric made from low-molecular-weight compounds such as ethylenediamine and monoethanolamine that have been converted into amino groups and OH groups. This is because the introduced ligand is an extremely small molecule, and the hydrophobicity of the base fiber developed in the present invention and the charge caused by the introduced ligand are close to each other, thereby allowing the more efficient removal. This can be applied to the filter that inexpensively removes biotoxic substances from water.

It is also possible to introduce polysaccharide and glycoprotein ligands. As an example, the endotoxin removal capacity was compared between a heparin-immobilized nonwoven fabric and a nonwoven fabric introducing lactoferrin, which is known to have a strong interaction with heparin. Heparin has strong anticoagulant activity and has the great advantage of increased blood compatibility when removing biotoxic substances from the blood, but has a negative charge to induce electrostatic repulsion against negative charge of endotoxin, and thus the removal amount was as small as 18%. On the other hand, for the nonwoven fabric immobilized with lactoferrin, which is known to have a strong interaction with LPS, to immobilize heparin by a strong interaction, and to be positively charged under physiological conditions, it was confirmed that endotoxin was removed with a high efficiency of 91%. This can be a nonwoven fabric that can remove endotoxins, lipids, and the like from the blood due to the strong interaction of lactoferrin combined with free iron in the blood while maintaining heparin-based blood compatibility.

Regarding gelatin, which is a protein and is known to interact with cell adhesion scaffolds and MMP, endotoxin adsorption experiments were performed on nonwoven fabrics using gelatin produced by two different treatments as immobilized ligands. In the alkali-treated gelatin-immobilized nonwoven fabric, the isoelectric point of the immobilized alkali-treated beef bone gelatin was found approximately around pH=5, and was negatively charged in the neutral region of pH=7.4. Therefore, in an adsorption experiment of negatively charged LPS in water, the removal rate was only about 38.5% after 2 hours, resulting in a certain amount of LPS removed due to the influence of hydrophobic interactions. Around pH=7.4, positively charged LDL and the like are considered to be effectively adsorbed. On the other hand, in the nonwoven fabric with acid-treated gelatin immobilized, the isoelectric point of the immobilized pork skin acid-treated gelatin was found at approximately around pH=8 to 9, which is close to that of the raw material collagen, and was positively charged in the neutral region of pH=7.4. Therefore, in an adsorption experiment of negatively charged LPS in water, the removal rate was approximately 98% after 2 hours, confirming the effectiveness. Overall, as the ligand for adsorbing LPS, the ligand with positive charges and hydrophobic moieties showed a high removal rate.

(5) Adsorption Capacity for Proteins, Lipids, and Iron in Normal Serum

The following eight types of nonwoven fabrics were used as the ligand-supported nonwoven fabrics used in the test.

- Polymyxin-immobilized nonwoven fabric (Example 2) PMx 10.4 mg
- Tryptophan-immobilized nonwoven fabric (Example 12) TPF 10.3 mg
- Arginine-immobilized nonwoven fabric (Example 13) ALG 10.6 mg
- Phenylalanine-immobilized nonwoven fabric (Example 14) PHA 10.1 mg
- Ethylenediamine immobilized nonwoven fabric (Example 16) EDA 9.8 mg
- Heparin-immobilized nonwoven fabric (Example 17) HEP 9.9 mg
- Heparin-lactoferrin immobilized nonwoven fabric (Example 19) HEP-LF 10.2 mg
- Acid-treated gelatin-immobilized nonwoven fabric (Example 21) ATG 10.7 mg Approximately 10 mg of each sample was cut into small pieces and added to a 5 ml glass tube previously, and the tube was primed with heparin saline and thoroughly wetted. Immediately before the experiment, the priming solution was removed using a pipette, and 2 ml of pig serum was added thereto at 37° C. Specifically, calcium chloride was added to the blood to activate the coagulation system, and 30 minutes later, the blood was centrifuged at 1200 G to collect the serum. At this point, 0.5 ml of untreated serum was collected into a control tube and used as a control serum for the test. Thereafter, 2 ml of serum was dispensed into test tubes for each of the 8 types of samples described above, and an adsorption experiment was performed at a shaking speed of 350 rpm using a shaker (manufactured by Bio-Rad Laboratories, Inc.) heated to 37° C. Sampling was performed 2 hours after the start of the adsorption experiment to obtain a serum test sample. The test items were total protein level, albumin level, iron level, total cholesterol level, free cholesterol level, ester cholesterol level, triglyceride level, LDL level, and HDL level. The test result is shown in Table 20. Adsorption experiments showed that lipids were adsorbed on nonwoven fabrics with heparin-lactoferrin, tryptophan, and acid-treated gelatin as ligands for total cholesterol value, free cholesterol value, ester cholesterol value, triglyceride, low density lipoprotein cholesterol, high density lipoprotein cholesterol value, and the like.

TABLE 20

Data of adsorption of protein, lipid, and iron for normal pig serum
Adsorption amount(%)

| | TP % | ALB % | Fe % | T-CHO % | F-CHO % | E-CHO | TG % | LDL-C % | HDL-C % |
|---|---|---|---|---|---|---|---|---|---|
| Tryptophan | 4.6 | 9.1 | 5.4 | 5.1 | 7.1 | 4.7 | 7.7 | 6.7 | 6.7 |
| Phenylalanine | 3.1 | 6.1 | 2.7 | 2.6 | 0 | 3.1 | 3.8 | 4.4 | 3.3 |
| Arginine | 3.1 | 3 | 4.5 | 5.1 | 0 | 6.3 | 3.8 | 4.4 | 3.3 |
| Heparin | 4.6 | 3 | 3.6 | 3.8 | 0 | 4.7 | 3.8 | 4.4 | 3.3 |
| Heparin-lactoferrin | 6.2 | 6.1 | 5.4 | 9 | 7.1 | 9.4 | 7.7 | 8.9 | 6.7 |
| Polymyxin | 3.1 | 3 | 3.6 | 5.1 | 0 | 6.3 | 7.7 | 6.7 | 6.7 |
| Ethylenediamine | 4.6 | 6.1 | 4.5 | 6.4 | 0 | 7.8 | 7.7 | 8.9 | 6.7 |
| Acid-treated gelatin | 6.2 | 6.1 | 4.5 | 7.7 | 7.1 | 7.8 | 3.8 | 6.7 | 6.7 |

TP: Total amount of protein
ALB: Albumin amount
Fe: Iron
T-CHO: Total cholesterol
F-CHO: Free cholesterol
E-CHO: Ester cholesterol
TG: Neutral fat triglyceride
LDL-C: Low density lipoprotein cholesterol
HDL-C: High density lipoprotein cholesterol

TABLE 21

Adsorption of bilirubin and bile acid
(Comparison of control blood and increase/decrease value)

| Ligand | T-BIL (%) | D-BIL (%) | I-BIL (%) | TBA (%) |
|---|---|---|---|---|
| Tryptophan | 0 | −50 | 25 | 8 |
| Phenylalanine | 17 | −100 | 75 | 4 |
| Arginine | 33 | −100 | 100 | 4 |
| Heparin | −17 | −50 | 0 | 4 |
| Heparin-lactoferrin | −17 | −100 | 25 | 8 |
| Polymyxin | 0 | −100 | 50 | 4 |
| Ethylenediamine | −17 | −50 | 0 | 4 |
| Acid-treated gelatin | 0 | −100 | 50 | 8 |

T-BIL: Total bilirubin
D-BIL: Direct bilirubin
I-BIL: Indirect bilirubin
TBL: Total bile acid (6) Adsorption Capacity for Bilirubin and Bile Acid in Normal Serum Eight types of nonwoven fabrics used for examining (5) Adsorption capacity for proteins, lipids, and iron in normal serum were used in the test. In addition, control serum and serum test samples were produced under the same conditions as (5) Adsorption capacity of proteins, lipids, and iron in normal serum. Test items were total bilirubin level, direct bilirubin level, indirect bilirubin level, and total bile acid level. The test result is shown in Table 21.

As shown in Table 21, it was confirmed that tryptophan, lactoferrin, and acid-treated gelatin, which are positively charged and hydrophobic, have a removal capacity of about 8%. Bilirubin is a molecule with a negative charge, and the nonwoven fabric introduced with the arginine ligand, which is the most basic amino acid, was confirmed to have the capacity of adsorbing 33% of total bilirubin and almost 100% of indirect bilirubin, indicating that the fabric may be a useful adsorbent.

INDUSTRIAL APPLICABILITY

The present invention can be used for blood purification, purification of pharmaceuticals and raw material liquids thereof, waste liquid treatment, and the like.

The invention claimed is:

1. A nonwoven fabric base material comprising a mixed resin of polyolefin and a styrene-olefin copolymer in a single fiber, which is used as a fiber material for liquid purification for removing a biotoxic substance from liquid, wherein a mass ratio of the polyolefin to a mass of the mixed resin is 10% by mass or more and 80% by mass or less, and a mass ratio of all styrene residues to a mass of the styrene-olefin copolymer is 5% by mass or more and 50% by mass or less.

2. The nonwoven fabric base material according to claim 1, wherein the mass ratio of the polyolefin to the mass of the mixed resin is 20% by mass or more and 50% by mass or less.

3. The nonwoven fabric base material according to claim 1, wherein the styrene-olefin copolymer is at least one copolymer selected from the group consisting of a saturated copolymer obtained by polymerization of an aromatic vinyl compound and an olefin having one double bond, an unsaturated copolymer of an aromatic vinyl compound and a diene having two conjugated double bonds, and a hydrogenated saturated copolymer obtained by hydrogenating the unsaturated copolymer.

4. A fiber material for liquid purification, comprising the nonwoven fabric base material according to claim 1, wherein a substituent containing a halogen group is introduced into the styrene-olefin copolymer as a spacer, some of the halogen groups of the spacer is replaced by a ligand that interacts with a biotoxic substance, and a halogen content in the fiber material for liquid purification is more than 0 μmol/g and 900 μmol/g or less relative to a mass of the fiber material for liquid purification.

5. The fiber material for liquid purification according to claim 4, wherein the halogen content in the fiber material for liquid purification is more than 0 μmol/g and 290 μmol/g or less relative to the mass of the fiber material for liquid purification.

6. The fiber material for liquid purification according to claim 4, wherein the ligand is derived from an amino acid, oligopeptide, peptide, saccharide, oligopolysaccharide, antibody, lipopolysaccharide, lipid, proteoglycan, protein, aptamer and/or polyelectrolyte that interacts with a biotoxic substance, the ligand has one or more nucleophilic substituents, and the ligand is supported on the styrene-olefin copolymer by chemical bonding between the nucleophilic substituent and the spacer.

7. A method for producing the fiber material for liquid purification according to claim 4, the method comprising:

a halogenation step of contacting a halogen compound with the nonwoven fabric base material to provide a halogenated nonwoven fabric; and a ligand supporting step of dehalogenating the halogenated nonwoven fabric to allow the ligand to be supported on the styrene-olefin copolymer.

8. The method for producing a fiber material for liquid purification according to claim 7, wherein the ligand is a polymyxin.

9. A cleaning device comprising the fiber material for liquid purification according to claim 4.

* * * * *